US012205584B1

United States Patent
Baker et al.

(10) Patent No.: US 12,205,584 B1
(45) Date of Patent: Jan. 21, 2025

(54) DIALOG-DRIVEN APPLICATIONS SUPPORTING ALTERNATIVE VOCAL INPUT STYLES

(71) Applicant: Amazon Technologies, Inc., Seattle, WA (US)

(72) Inventors: John Baker, Bellevue, WA (US); Anubhav Mishra, Seattle, WA (US); Bangrui Liu, Seattle, WA (US); Christopher Michael Hittner, Seattle, WA (US); Sravan Babu Bodapati, Redmond, WA (US); Harshal Pimpalkhute, Redmond, WA (US); Katrin Kirchhoff, Seattle, WA (US); Anuj Gautam Surana, Mountlake Terrace, WA (US); Yilai Su, Mercer Island, WA (US); Brandon Louis Mendez, Seattle, WA (US); Chengshun Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 371 days.

(21) Appl. No.: 17/532,986

(22) Filed: Nov. 22, 2021

(51) Int. Cl.
*G10L 15/22* (2006.01)
*G10L 13/027* (2013.01)
*G10L 15/08* (2006.01)

(52) U.S. Cl.
CPC ............ *G10L 15/22* (2013.01); *G10L 13/027* (2013.01); *G10L 15/08* (2013.01); *G10L 2015/221* (2013.01); *G10L 2015/223* (2013.01)

(58) Field of Classification Search
CPC ......... G10L 15/22; G10L 13/27; G10L 15/08; G10L 2015/221; G10L 2015/223

USPC .......................................................... 704/275
See application file for complete search history.

(56) References Cited

U.S. PATENT DOCUMENTS

| 6,246,981 B1 | 6/2001 | Papineni et al. |
| 6,510,411 B1 | 1/2003 | Norton et al. |
| 7,197,460 B1 | 3/2007 | Gupta et al. |
| 8,626,507 B2 | 1/2014 | Bangalore et al. |

(Continued)

FOREIGN PATENT DOCUMENTS

| EP | 2933070 | 10/2018 | |
| JP | 2003044988 | * 2/2003 | ............... G06F 3/16 |

(Continued)

OTHER PUBLICATIONS

Rouillard, "Web services and speech-based applications," 2006 ACS/IEEE International Conference on Pervasive Services, Lyon, France, 2006, pp. 341-344, doi: 10.1109/PERSER.2006.1652258. keywords: {Web services;Speech synthesis; Context-aware services;Speech recognition; Vocabulary; Telephony; Natural (Year: 2006).*

(Continued)

*Primary Examiner* — Bharatkumar S Shah
(74) *Attorney, Agent, or Firm* — Robert C. Kowert; Kowert, Hood, Munyon, Rankin & Goetzel, P.C.

(57) ABSTRACT

A set of alternative vocal input styles for specifying a parameter of a dialog-driven application is determined. During execution of the application, an audio prompt requesting input in one of the styles is presented. A value of the parameter is determined by applying a collection of analysis tools to vocal input obtained after the prompt is presented. A task of the application is initiated using the value.

20 Claims, 14 Drawing Sheets

(56) References Cited

U.S. PATENT DOCUMENTS

| | | | |
|---|---|---|---|
| 9,070,367 | B1 | 6/2015 | Hoffmeister et al. |
| 10,303,773 | B2 | 5/2019 | Curtis et al. |
| 10,331,791 | B2 | 6/2019 | Anbazhagan et al. |
| 10,832,008 | B2 | 11/2020 | Banerjee et al. |
| 10,848,443 | B2 | 11/2020 | Helmy |
| 10,891,152 | B2 | 1/2021 | Anbazhagan et al. |
| 11,568,135 | B1* | 1/2023 | Mansour ............... G06N 20/00 |
| 2007/0143099 | A1 | 6/2007 | Balchandran et al. |
| 2010/0298012 | A1 | 11/2010 | Damarla |
| 2015/0263941 | A1 | 9/2015 | Jung |
| 2016/0042748 | A1 | 2/2016 | Jain et al. |
| 2016/0225370 | A1 | 8/2016 | Kannan et al. |
| 2017/0116982 | A1* | 4/2017 | Gelfenbeyn ......... G10L 15/1815 |
| 2017/0125008 | A1 | 5/2017 | Maisonnier et al. |
| 2017/0286916 | A1* | 10/2017 | Skiba ................ B25J 11/0005 |
| 2021/0132986 | A1* | 5/2021 | Anbazhagan ......... G06F 9/4843 |

FOREIGN PATENT DOCUMENTS

| | | | | | |
|---|---|---|---|---|---|
| JP | 2003044988 | A | * | 2/2003 | ............ G06F 3/16 |
| KR | 20090090613 | | * | 8/2009 | ......... G08F 17/3073 |
| KR | 20090090613 | A | * | 8/2009 | ......... G08F 17/3073 |
| WO | 9723088 | | | 6/1997 | |

OTHER PUBLICATIONS

Svetlana Stoyanchev et al "Rapid Prototyping of Form-driven Dialogue Systems Using an Open-Source Framework", Proceddings of the Sigdial 2016 Conference, pp. 216-219.

Claus Brabrand "PowerForms: Declarative client-side form field validation" Brics Report Series, Jan. 1, 2000, pp. 205-214.

Robert Jamison, "Announcing a New Tool for Building Interactive Adventure Games on Alexa", Amazon Mobile App Distribution Blog, Retrieved from URL: https://developer.amazon.com/public/community/post/TxEQV5K754YS77/Announcing-a-New-Tool-for-Building-Interactive-Adventure-Games-on-Alexa on Oct. 30, 2016, pp. 1-11.

"Getting Started with the Alexa Skills Kit", Amazon Apps & Games Developer Portal, Retrieved from URL: https://developer.amazon.com/pulbic/solutions/slexas/alexa-skills-kit/getting-started-guide on Oct. 30, 2016, pp. 1-7.

Seth Rosenberg, "How to Build Bots for Messenger", Facebook for Developers, Retrieved from URL: https://developers.facebook.com/blog/post/2016/04/12/bots-for-messenger on Oct. 30, 2016, pp. 1-5.

Ali El-Kahky, et al., "Entending Domain Coverage of Language Understanding Systems Via Intent Transfer Between Domains Using Knowledge Graphs and Search Query Click Logs", 2014 IEEE International Conference on Acoustic, Speech and Signal Processing (ICASSP), pp. 4087-4091.

Elad Natanson, "Messaging Platforms, Bots and The Future of Mobile", Retrieved from URL: http://www.forbes.com/sites/eladnatanson/2016/04/08/messaging-platforms-bot-and-the-future-of-mobile/#2d1ab79884af on Oct. 30, 2016. pp. 1-7.

"Messenger Platform", Facebook for Developers, Retrieved from URL: https://developers.facebook.com/doc/messenger-platform on Oct. 30, 2016, pp. 1-3.

Collen Estrada, "Microsoft Bot Framework", Mar. 30, 2016, Retrieved from URL: https://blog.botframework.com/2016/03/30/BotFramework/ on Oct. 30, 2016, pp. 1-7.

"Microsoft Cognitive Services—APIs", Retrieved from URL: https://www.microsoft.com/cognitive-services/en-us/apis on Oct. 30, 2016, pp. 1-8.

Himanshu S. Bhatt, et al., "Cross-domain Text Classification with Multiple Domains and Disparate Label Sets", Proceedings of the 54th Annual Meeting of the Association for Computational Linguistics, Aug. 7-12, 2016, pp. 1641-1650.

Amit Fulay, "Say hello to Google Allo: a smarter messaging app", Retrieved from URL: https://blog.google/products/allo/google-allo-smater-messaging-app on Oct. 30, 2016, pp. 1-14.

"Training for the Alexa Skills Kit", Amazon Apps & Games Developer Portal, Retrieved from URL: https://developer.amazon.com/public/solutions/alexa/alexa-skills-kits/content/alexa-skilss-developer-training on Oct. 30, 2016, pp. 1-4.

Wikipedia, "Vorbis", Retrieved from URL: https://en.wikipedia.org/wiki/Vorbis on Sep. 26, 2016, pp. 1-10.

U.S. Appl. No. 17/030,204, filed Sep. 23, 2020, Saab Mansour.

U.S. Appl. No. 17/039,900, filed Sep. 30, 2020, Swapandeep Singh et al.

U.S. Appl. No. 17/039,920, filed Sep. 30, 2020, Jin Hoon Bang et al.

U.S. Appl. No. 17/219,640, filed Mar. 31, 2021, Pokkunuri, et al., Amazon Technologies, Inc.

U.S. Appl. No. 17/219,630, filed Mar. 31, 2021, Pushkin, et al., Amazon Technologies, Inc.

U.S. Appl. No. 17/039,889, filed Sep. 30, 2020, Swapandeep Singh.

* cited by examiner

DIALOG-DRIVEN APPLICATIONS SUPPORTING ALTERNATIVE VOCAL INPUT STYLES

BACKGROUND

In recent years, the number of small-footprint sensor-containing devices such as smart phones, wearable devices, personal assistant devices and various other "Internet of Things" (IoT) devices which can be used for accessing a variety of distributed or remote applications have been increasing dramatically. Many of these devices comprise sensors capable of detecting voiced commands; in some cases, sensors for detecting signals of other modalities such as dual tine multi frequency (DTMF) signals, text and the like may also be incorporated in these devices. The small-footprint devices are often designed to communicate with server farms at data centers which can be used to perform application tasks based on the input provided via the devices.

In principle, the proliferation of devices that can collect voice signals (as well as signals of other modalities) increases the number of channels that can be used by vendors to provide various services and applications, thereby potentially increasing revenues for their businesses. Many customers may find it much more appealing or intuitive to, for example, order a meal using voiced commands than to order the meal after filling out a form on a computer screen. Customers may typically prefer to use conversational or "natural" language to express their commands or intentions, in a manner similar to the way they would interact with other individuals, rather than being restricted to using specific "canned" phrases in a certain sequence. Applications which are designed to interact conversationally with customers may be referred to as dialog-driven applications.

In order to understand the intention of an end user and initiate the appropriate actions, a dialog-driven application may have to determine values of various parameters, such as the end user's first and last name, a reservation code, a membership number, an email address and the like. In some cases, for example when pronunciations of several different names or phrases are quite similar, vocal input provided by an end user to specify such parameters may not be straightforward to interpret.

Figure 1:
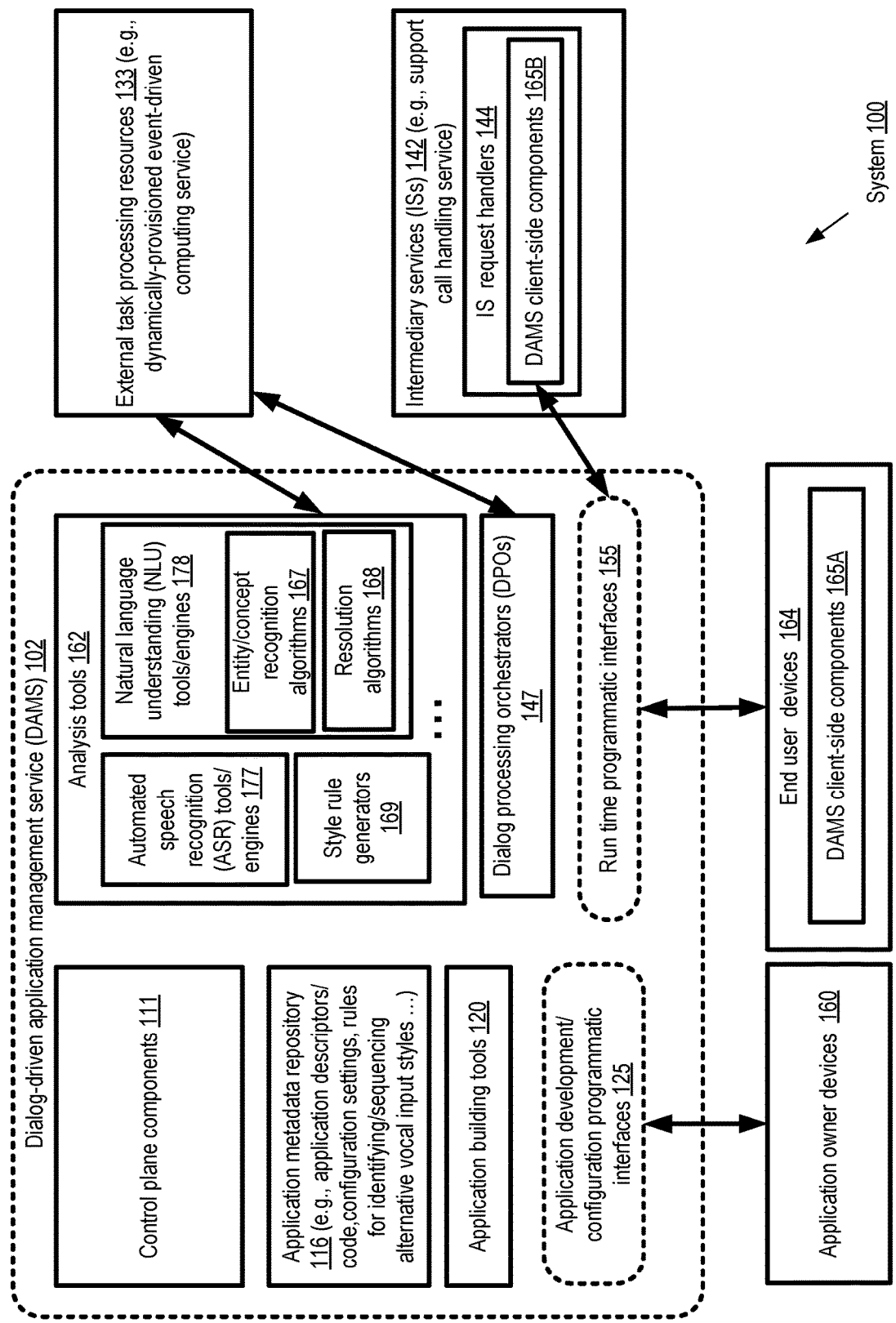
FIG. 1 illustrates an example system environment in which end user input may be obtained at a dialog-driven application management service in several different alternative vocal input styles to help accelerate the determination of parameter values, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for shortening the time it takes dialog-driven applications to interpret end user intentions correctly, by supporting several different alternative styles of vocal input, and hence enhancing the quality end user interactions. As used herein, the term "dialog-driven application" refers to an application in which, in order to complete a particular task or function, respective values of one or more parameters may be obtained from analysis of input provided by an end user of the application via one or more modes/formats of conversational interactions, such as audio (voice), text, dual tone multi-frequency (DTMF) signals, video, or combinations of such modes/formats. In many cases, an end user may prefer one mode (such as voice input) to others, especially if the end user happens to be using a device such as a phone to communicate with the dialog-driven application.

To provide a value for some types of parameters of a dialog-driven application such as names, email addresses and the like using voice, an end user may begin by simply providing the value using typical word-level pronunciations—e.g., the end user may utter the sentence "My name is Will Wright" in response to a request for their name. The dialog-driven application may attempt to interpret/understand the utterance of the end user and request a confirmation that the interpretation was correct: e.g., the application may cause the following audio to be presented: "I think you said that your name as Jill Knight. Is that correct?" The application may have misinterpreted the vocal input provided by the end user for any of a variety of reasons—e.g., because the quality of the voice connection used by the end user is poor, because there is ambient noise in the background, because the end user has a cold which affects their voice, and so on. Instead of repeatedly asking for the input to be provided in the same way, which can potentially lead to further failures of interpretation, in some embodiments the dialog-driven application may request that the end user provide the requested information using an alternative vocal style which can be used to quickly eliminate ambiguity. In the example scenario provided above, the application may cause audio similar to the following to be presented: "I think you said that your name as Jill Knight. Is that correct? If not, you can spell out your name if you prefer." In response, the end user may say something like "OK, let me spell it out. My first name is spelled W, I, L, L and my last name is spelled W, R, I, G, H, T", speaking each letter separately. A representation of this second set of the end user's vocal input, along with an indication of the style used (e.g., "pronounce-each-letter-separately") may be passed on to various analysis tools such as automated speech recognition (ASR) and natural language understanding (NLU) tools utilized by the application, and the correct value of the parameter may be determined rapidly with the help of the tools. Other vocal input styles, such as specifying a parameter value using example words (e.g., "W as in Western, I as in India, . . . ") may also be supported in some embodiments. By allowing end users to specify their input in different styles, the probability of frustrating the end user by repeatedly asking for the same input may be reduced, parameter values may be found more quickly and with a higher degree of certainty, and the overall end user experience with the dialog-driven application may be enhanced in various embodiments.

According to at least some embodiments, a network-accessible service referred to as a dialog-based application management service (DAMS) may be set up at a provider network or cloud computing environment to implement such techniques on behalf of application owners and application end users. In some embodiments a DAMS may be used at least in part to host or implement "bot" or "chatbot" functionality, for example for handling customer support operations of an organization, and may thus be referred to as a "bot" or "chat bot" service or framework. A DAMS may also be referred to as a dialog flow handling service in some embodiments.

At a high level, a DAMS may provide at least two types of functionality related to dialog-driven applications in various embodiments. For application developers and administrators, for example, the DAMS may provide tools and mechanisms for developing, dynamically configuring and deploying dialog-driven applications. For handling requests from end users of the dialog-driven applications, the DAMS may provide scalable and highly available resources that can be used to run the applications. To simplify the presentation, the term "application owners" may be used herein to refer to individuals or organizations involved in the design, development, configuration and deployment of dialog-driven applications which are to be used by end users. To support potentially large numbers of end users of the dialog-driven applications, the DAMS may execute the logic of the applications using a fleet of servers which communicate with client-side components (e.g., apps, browser plug-ins, or other programs) running on end user devices such as phones, laptops, tablets, Internet-of-Things (IoT) devices and the like. A given dialog-driven application may often comprise one or more sequences of bidirectional interactions between end users and the servers of the DAMS. A given interaction may in turn comprise (a) one or more end user "utterances" (logically-grouped related user input provided via some combination of audio, text, DTMF, or the like, for which a coherent response can be generated after the logically-grouped related user input is analyzed/processed), and (b) corresponding responses transmitted to the end user from the DAMS servers based on analysis of the utterances, the logic of the dialog-driven application, and/or results of actions initiated by the DAMS servers based on the analysis. Note that the user input for dialog-driven applications may be informal and conversational in nature in various embodiments, without imposing strict grammatical or linguistic requirements on the content of user input.

Using various easy-to-use programmatic interfaces implemented at a DAMS, such as a graphical user interface of a web-based console, an application developer may be able to specify the logic of a dialog-driven application without providing the source code to be used for managing the flow of multi-step interactions of end users with the application. The application developer may optionally provide an indication of the alternative vocal input styles that can be used for specifying various parameters. At run-time, after the interactions with the developer regarding the multi-step dialog have been completed and an executable version of the program has been generated and deployed, as mentioned above, ASR algorithms, NLU algorithms, text processing algorithms and/or other types of user input analysis algorithms (at least some of which may employ machine learning) may be used to capture and interpret the dialog with individual end users. Application developers may not need to specify details regarding the particular algorithms to be used, or even be aware of the algorithms that are used in at least some embodiments.

The DAMS may be designed to enable dialog-driven applications for any desired problem domains (e.g., financial applications, customer support, applications for ordering food, travel-related applications, entertainment-related applications and like) and a variety of end user device types (e.g., voice-directed personal assistants, smart phones, wearable devices, and the like) to be developed and deployed easily, without requiring application owners to worry about end user device capabilities or the provisioning and management of specific resources to be used for the applications. In some cases, the DAMS may enable the integration of existing applications (which may be executed using a variety of different resources) with a dialog-based front-end capability with a minimum of programming effort. The application owners may use the interfaces of the DAMS to indicate high-level steps of the dialogs needed to identify parameter values associated with various tasks to be performed using the application, and the programs, services or resources to be invoked to perform or fulfill the tasks after the parameter values for the tasks have been identified using the dialogs in various embodiments. A given dialog-driven application may indicate one or more "intents" associated with a particular problem domain. Each of the intents may correspond to a particular task to be initiated on behalf of an end user of the application (such as, for example, ordering a pizza or some other part of a meal, changing an airline reservation etc.), and each intent may be identified and executed based on analysis of a collection of end user inputs or utterances. Any desired combinations of a number of different types of resources may be used to fulfill the application tasks or intents in various embodiments, including resources of other network-accessible services. In general, much of the complexity typically associated with dialog-driven applications (including providing the logic for the dialog steps, or for the logic for dialog capture and interpretation) may be eliminated, leaving application owners free to concentrate on the business logic of their applications. By quickly adding dialog-driven front-ends to existing or new applications, the number of end user engagement channels available for the applications may be substantially expanded in many cases, and the increased ease of use resulting from natural language interactions may expand the size of the applications' customer base. By supporting alternative vocal input styles, user input that may be hard to interpret may be disambiguated very quickly, thereby reducing the probability of end user dissatisfaction in various embodiments. In at least some embodiments, respective versions of ASR or NLU finite state transducers, models or other tools may be generated which are respectively optimized to analyze input in each of the alternative vocal input styles. In other embodiments, different portions of a given analysis tool (e.g., an NLU tool or an ASR tool) may be exercised depending on the specific vocal input style used for the input being analyzed.

As one skilled in the art will appreciate in light of this disclosure, certain embodiments may be capable of achieving various advantages, including some or all of the following: (a) reducing the overall amount of network, computing, and/or storage resources and time utilized for implementing dialog-driven applications and/or (b) improving the user experience of end users of dialog-driven applications.

According to some embodiments, a system may comprise one or more computing devices. The computing devices may include instructions that upon execution on or across one or more processors of the computing devices cause the computing devices to determine, at a DAMS, (a) a set of alternative vocal input styles for specifying a value of a particular parameter of a dialog-driven application and (b) a default sequence, of at least a subset of alternative vocal input styles of the first set, in which input associated with the particular parameter is to be requested from a client of the dialog-driven application until a value of the particular parameter is determined. The set of alternative vocal input styles may, for example, include a word-pronunciation style (the normal way in which users provide information about parameters such as names, pronouncing a word at a time), a pronounce-each-letter-separately style (e.g., saying the letters W, I, L and L individually to spell "Will"), a spell-using-example-words style (e.g., expressing the name Will by saying "W as in water, I as in India, L as in London, L as in London"), or a custom style defined by a developer of the application for the application's problem domain. The default sequence may indicate, for example, that the word-pronunciation style should be used first, that the pronounce-each-letter-separately style should be used if the parameter's value isn't determined correctly using the word-pronunciation style, and the spell-using-example-words style should be used if the parameter's value isn't determined correctly even after the pronounce-each-letter-separately style is used.

An audio prompt requesting input in a particular alternative vocal style of the set of alternative vocal styles may be presented to an end user during execution of the application in various embodiments. In some embodiments the audio prompt may be presented according to the default sequence (e.g., after prompts for other styles have been presented, based on the way in which the styles are arranged in the default sequence, and the value for the parameter hasn't been identified correctly using the other styles). In other embodiments the prompt requesting the use of the particular vocal style may be presented based on analysis of input provided earlier by the end user, and not necessarily according to the default sequence. A representation of vocal input provided by an end user or client of the application at least partly in the requested style may be received in response to the audio prompt (i.e., after at least a portion of the audio prompt is presented). A collection of analysis tools (e.g., including ASR and/or NLU tools, including for example finite state transducers (FSTs), neural network-based machine learning models, statistical n-gram models and the like) may be applied to the vocal input to determine the value of the parameter in various embodiments. In at least some embodiments, an indication of the requested style may be passed as a parameter to the analysis tools, enabling the appropriate models/programs customized for the style to be used to analyze the vocal input. The value of the parameter may then be used at the DAMS to initiate a task of the application.

In some embodiments, the developer or owner of the dialog-driven application may provide guidance (e.g., as part of the development of the application) as to which specific styles should be used for a given parameter of the application, and/or the sequence in which end user input in the styles should be requested for the given parameter. In other embodiments, the DAMS may determine or identify a style to be used for a given interaction with a client without receiving guidance specifying the style from the application owner or developer. For example, the DAMS may be able to deduce or infer rules for identifying potential alternative styles suitable for a parameter based on a data type of the parameter, based on example prompts provided by the application owner/developer for the parameter, and/or based on analysis of input (e.g., the first few phonemes) provided by the client in response to a first prompt for the parameter. In some cases, a rule to be applied for determining that input in a particular style is to be requested from an end user may indicate that input in the particular style should only be requested after an attempt to determine the value of the parameter based on analysis of vocal input in a different style has failed, for example.

Different sets of styles may be used for specifying respective parameters of a given application in at least one embodiment; that is, not all the parameters of a given application or a given parameter data type may need to support input in the same set of alternative vocal input styles. In some embodiments a client (e.g., an end user) of the application may be provided a list of multiple styles that can be used for specifying the parameter. The client may then choose a particular style from the multiple styles, and provide the input in that style. The choice made by the client may then be passed on to the analysis tools to help interpret the vocal input. In at least one embodiment, a client or end user may use a mix of styles to express a value of a parameter—e.g., part of the parameter value may be spelled out a letter at a time, with the rest being pronounced at word level. In such a scenario, the DAMS may use a combination of several different analysis tools (each customized for a particular style) to interpret the mixed-style vocal input. In at least one embodiment, the DAMS may be able to interpret a portion of the client's vocal input with a higher degree of certainty than the remainder. An audio prompt indicating the successfully-interpreted or high-confidence portion of the vocal input, and requesting a clarification of the remaining portion using an alternative vocal input style may be presented to the client. In one embodiment in which multi-modal interactions are supported, the DAMS may request that the client provide input using a text interface (or a DTMF interface) if the value of the parameter hasn't been determined despite the use of an alternative vocal input style.

FIG. 1 illustrates an example system environment in which end user input may be obtained at a dialog-driven application management service in several different alternative vocal input styles to help accelerate the determination of parameter values, according to at least some embodiments. As shown, system 100 comprises artifacts and resources of dialog-driven application management service (DAMS) 102, including application building tools 120, an application metadata repository 116, analysis tools 162, and control plane components 111.

DAMS 102 may implement a variety of programmatic interfaces in the depicted embodiment, including for example one or more web-based consoles, graphical user interfaces, command-line tools, and/or a collection of application programming interfaces (APIs). The programmatic interfaces may be broadly classified into application development and configuration programmatic interfaces 125 and end-user run time programmatic interfaces 155. The application development and configuration programmatic interfaces 125 may be used by application owners and developers to create and provide preferred configuration settings (including, if desired, settings for the use of alternative vocal input styles) for various dialog-driven applications which are to be executed using the DAMS and/or external task fulfillment resources 133 in various embodiments. Application owners may interact with the DAMS 102 via the interfaces 125 from a variety of application owner devices 160 in different embodiments, such as desktop computers, laptops, mobile devices and the like. Information about the dialog-driven applications, such as logical descriptors of the applications, program code (e.g., in source code or executable form), configuration settings for various stages or interaction categories of the applications, as well as rules for identifying and/or sequencing alternative vocal input styles may be stored in an application metadata repository 116 in at least some embodiments.

Control-plane components 111 of the DAMS 102 may be responsible for administration of other resources and artifacts of the DAMS in the depicted embodiment. The tasks performed by the control-plane components 111 may include, for example, provisioning individual servers of an application execution server fleet used for running instances of dialog-driven applications, monitoring the health states of the resources, establishing and maintaining connectivity between the application execution server fleet and analysis tools 162, establishing and maintaining connectivity between the application execution server fleet and external task fulfillment resources 133, and so on.

End users (also referred to as clients) of dialog-driven applications may interact with the applications via programmatic interfaces 155 in the depicted embodiment. A variety of end user devices 164 may be used to interact with dialog-driven applications in different embodiments, such as phones, tablet computing devices, wearable computing devices such as smart watches, game-playing devices or consoles, automated personal assistant devices, augmented reality devices, virtual reality devices, IoT devices, laptops, other mobile devices, desktops, compute instances of virtualized computing services, and so on. The end user input may be processed initially (e.g., subdivided into smaller units called events or blocks, each comprising a few hundred bytes of data) at DAMS client-side components 165A at the end user devices, and then representations of the end user-generated input may be transmitted to the DAMS from the client-side components 165A in the depicted embodiment via programmatic interfaces 155. In some implementations, a client-side component 165A may comprise one or more processes or threads of execution.

Within the DAMS, the processing of end user input may be coordinated by one or more dialog processing orchestrators (DPOs) 147 in the depicted embodiment. A given DPO may for example, transmit messages to and receive messages from client side-components 165A, ASR tools/engines 177, and/or NLU tools/engines 178 implementing entity/concept recognition algorithms 167 and/or meaning resolution algorithms 168 in the depicted embodiment.

Depending on the type of action the end user wishes to perform using the dialog-driven application, several interactions with the DAMS may be required, e.g., over one or more connections established between a client-side component 165A and one or more servers of the DAMS in at least some embodiments. A given interaction may, for example, comprise transmission of a set of user-generated input, analysis of the user-generated using analysis tools 162, and a response provided to the end user from the server. In at least some embodiments, one or more resources external to the DAMS 102 may be used to initiate tasks of a dialog-driven application after a set of parameters for the tasks have been obtained from the user-generated input. Such tasks may include, for example, retrieval of requested bank or credit card information from a source such as a financial organization's database, ordering of an item from a catalog, and so on. External task fulfillment resources 133 may include, for example, a dynamically-provisioned event driven computing service of a provider network or cloud computing environment, other computing or storage services of a cloud computing environment, resources located at data centers of the application owners, and so on.

In at least one embodiment, dialog-driven applications may be utilized by one or more intermediary services (ISs)

142 on behalf of some types of end users. For example, an IS 142 may comprise a support call handling service, implemented at a provider network, which handles customer support requests for one or more applications. When an end user of such an application submits an audio or text-based request for technical support, an IS request handler 144 may establish a connection between a DAMS client-side component 165B and the DAMS using programmatic interfaces 155 in the depicted embodiment. At least some of the interactions of the end user may then be handled with the help of dialog-driven applications deployed at the DAMS's application execution server fleet in such embodiments. In some cases, if for example the problem for which support was requested cannot be fully resolved by the dialog-driven application, the responsibility for the resolution of the problem may be transferred from the DAMS to human support staff.

According to various embodiments, a set of alternative vocal input styles for specifying values of a parameter of a dialog-driven application may be determined at the DAMS, e.g., either based on input provided by an application developer/owner or based on rules automatically generated or inferred/deduced at the DAMS by one or more style rule generators 169. In some embodiments, machine learning techniques may be employed by the style rule generators to produce rules which can be used to infer, at run-time, the set of alternative styles that can potentially be used to obtain values for a given parameter of an application. In some cases, the algorithms/rules used to determine the set of alternative styles automatically (without specific guidance from application developers or owners) may analyze the example prompts provided by the developers for the parameter, or may analyze the first few phonemes of the vocal input provided by the end user or client to infer the appropriate alternative styles to be used. As part of the interactions with a client at run time, an audio prompt requesting input in one of the alternative styles applicable to the current parameter may be presented to the client. After the client provides the input in the requested style, an indication of the style may be passed as a parameter to at least some of the analysis tools used to interpret the input. Once the analysis tools provide the interpreted value of the parameter and the value has been confirmed with the client, an action or task of the application may be initiated using the confirmed parameter value in various embodiments. Different sets of alternative input styles may be utilized for respective parameters of an application. A list of available styles that a client can use for specifying a parameter may be presented to a client if desired in some embodiments, and the particular style selected by the client may be passed on to the analysis tools to help interpret the subsequent vocal input of the client. Alternative vocal input styles may be used for a variety of parameter types of dialog-driven applications in different embodiments, including but not limited to a name (e.g., first name, middle name, or last name) of an end user, a street address, an email address, a postal code, or an alphanumeric identifier (such as an airline reservation code). In some cases, a client may provide vocal input using a mixture of styles, and the DAMS may collectively use analysis tools optimized for a variety of styles to interpret the mixed-style input.

Figure 2:
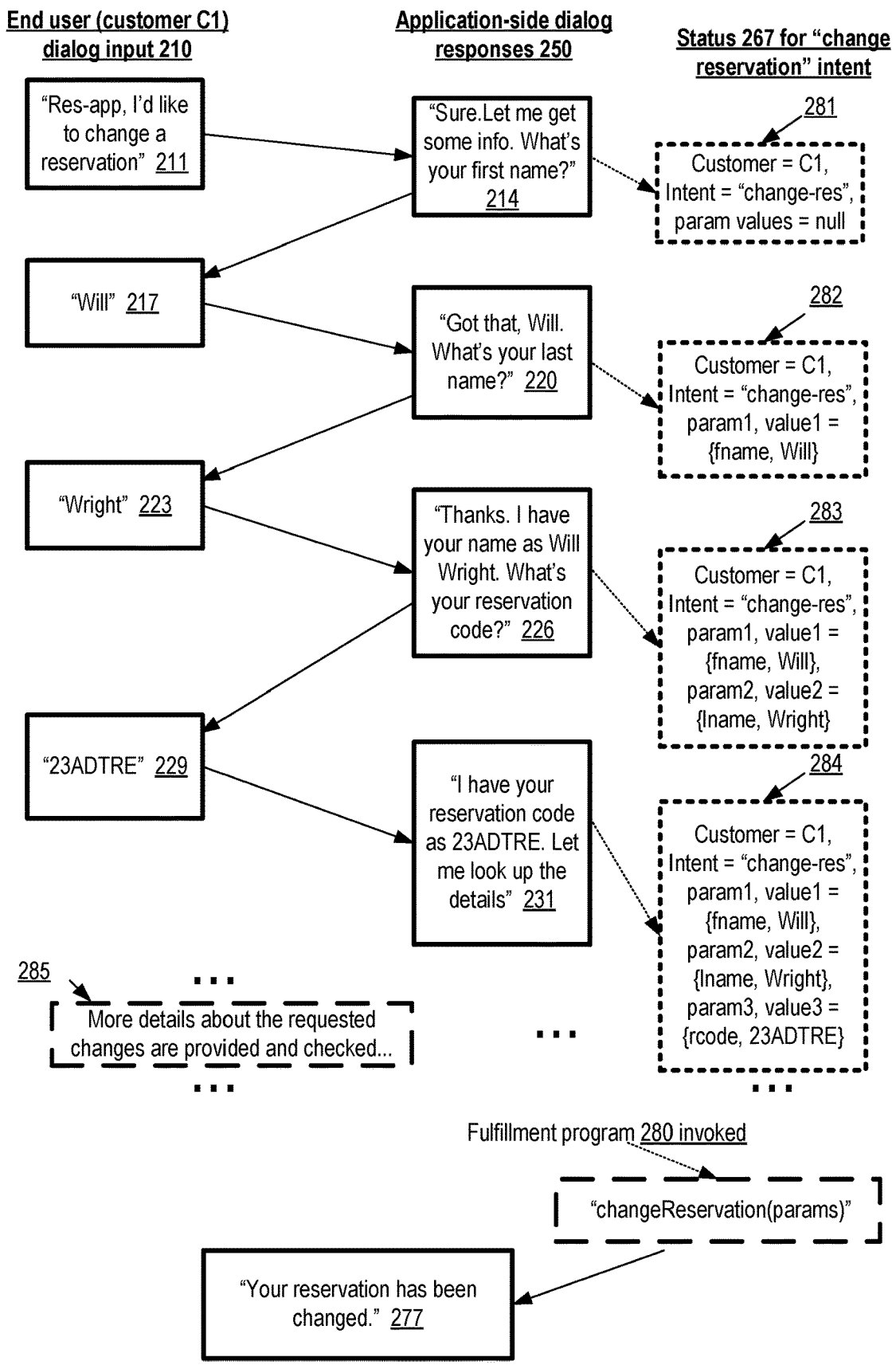
FIG. 2 illustrates example steps of a multi-step dialog with a dialog-driven application for changing a reservation, according to at least some embodiments.

FIG. 2 illustrates example steps of a multi-step dialog with a dialog-driven application for changing a reservation, according to at least some embodiments. In the depicted embodiment, a customer C1 verbally interacts with an application which has been developed and deployed using a DAMS similar in functionality to DAMS 102 of FIG. 1. Examples of the customer's verbal statements are shown in the left part of FIG. 2, labeled "End user (customer C1) dialog input 210". Examples of the application's responses corresponding to the end user input are shown under the label "Application-side dialog responses 250". As the interactions proceed, the application in effect fills out a data structure with intent parameter values, shown in the rightmost part of FIG. 2 under the label "Intent status 267 for "change reservation" intent.

The customer initiates a conversation or dialog with the application with the utterance "Res-app, I'd like to change a reservation" 211 in the depicted example. The introductory term "res-app" may be considered a "wake word" or a "wake phrase"—a signal to distinguish the interaction with the reservation change application from other conversations that may be detected by the audio sensor(s) or microphone(s) being used for the application. ASR/NLU analysis resources/tools may be used by the DAMS to identify/interpret the words spoken by the customer. A conversational response "Sure. Let me get some info. What's your first name?" 214 may be generated as part of the application's dialog-flow and provided to the customer via a speaker component of the end user device being used. In addition, the DAMS server implementing the application may instantiate an intent called "change-res", store an indication of the identity of the customer (C1), and an indication that no parameter values have yet been determined for the intent (as indicated by "param values=null") in intent status 281. The owner of the application associated with the "change-res" intent may have indicated, via the programmatic interfaces of the DAMS, that among the parameters associated with the intent, the first one whose value should be ascertained is "first name"; as a result, the phrase "What's your first name" may be included in the response 214.

Customer C1 may respond with the pronounced word "Will" 217 in the depicted example. The analysis tools used by the DAMS may ideally be able to recognize the word "Will" spoken by C1, and respond with "Got that, Will. What's your last name" 220. The customer may respond with a single-word answer "Wright" 223 in the depicted example. If the analysis tools at the DAMS are able to correctly interpret C1's last name, the response 226 may be presented: "Thanks. I have your name as Will Wright. What's your reservation code?" leading to further responses from C, such as "23ADTRE" for the reservation code. As each parameter's value is obtained from C1 and confirmed with C1, the status 267 for the "change reservation" intent may change, as indicated in elements 282, 283 and 284. The "fname" (first name) parameter may be set to "Will" in status 282, the "lname" (last name) parameter may be set to "Wright" in status 283, and the "rcode" (reservation code) parameter may be set to "23ADTRE" in status 284. More details about the requested change may be provided and checked/confirmed with C1 via further interactions as indicated in element 285. Eventually, an action or task (the requested change to the reservation) may be performed by the DAMS by invoking a fulfillment program 280 (e.g., using an application programming interface such as "changeReservation(params)") after all the information needed for the change is obtained via the dialog. A message "Your reservation has been changed" 277 may be presented to C1 after the change is successfully committed or completed in the depicted embodiment.

Figure 3:
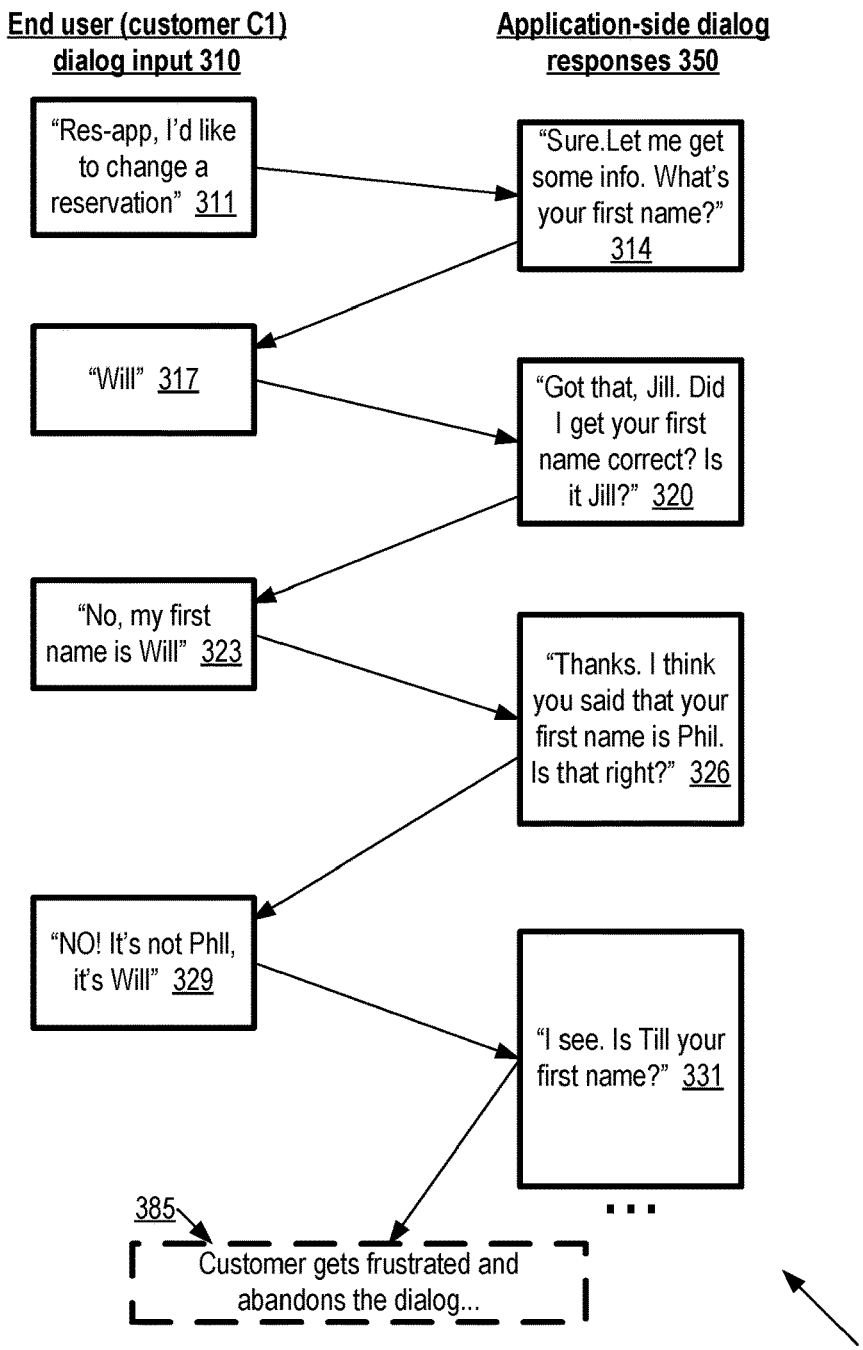
FIG. 3 illustrates an example of a scenario in which a dialog-driven application which expects vocal input in only one vocal style may be unable to determine the correct value of a parameter despite several attempts to do so, according to at least some embodiments.

In the example presented in FIG. 2, the DAMS is able to successfully interpret the vocal input provided by client C1 at the first attempt for each parameter. However, it may sometimes be the case that the analysis tools used at the DAMS are unable to interpret the vocal input provided by a client for one or more parameters of the application, which can lead to client dissatisfaction. FIG. 3 illustrates an example of a scenario in which a dialog-driven application which expects vocal input in only one vocal style may be unable to determine the correct value of a parameter despite several attempts to do so, according to at least some embodiments. Customer C1's dialog input 310 begins with the same initial utterance 311 as in FIG. 2: "Res-app, I'd like to change a reservation". Application-side dialog responses 350 also begin the same way as in FIG. 2; the utterance "Sure. Let me get some info. What's your first name?" 314 is presented to C1. C1 provides the first name "Will" 317.

This time, in contrast to the scenario depicted in FIG. 2, the analysis tools used by the DAMS mistakenly interpret C1's name as "Jill". Such mistaken interpretations can arise for a variety of reasons in different embodiments, such as distortion in the audio representation received at the DAMS, environmental noises or disturbances, unusual accents of the customer, and so on. Because there is some level of uncertainty at the DAMS regarding the first name, the DAMS presents the message "Got that, Jill. Did I get your first name correct? Is it Jill?" 320 to C1, without indicating that any alternative vocal style (other than the pronounced-word style used earlier) is acceptable in the depicted embodiment.

In response to the message 320, the client says "No, my first name is Will" 323 in the depicted example. The representation of client utterance 323 is analyzed by the DAMS. Unfortunately, the client's first name is again misinterpreted, this time as Phil. The message "Thanks. I think you said that your first name is Phil. Is that right?" 326 is presented to the client. The client tries again, saying "NO! It's not Phil, it's Will" 329. The DAMS is again unable to interpret the client correctly, and presents response message 331 "I see. Is Till your first name?". By this time, the customer C1 has become angry, and C1 simply abandons the dialog. C1's reservation remains unchanged, and C1 may have to try again to modify the reservation as desired. As shown in FIG. 3, if the application is unable to reasonably quickly understand what the end user said, despite repeated attempts to do so, the end user's frustration level may increase so much that the entire transaction or task is abandoned. The organization responsible for changing the reservation may have to expend substantial resources (e.g., including time of a human responder) to satisfy the needs of their customer C1. A solution to the kind of problem shown in FIG. 3 is presented in FIG. 4

Figure 4:
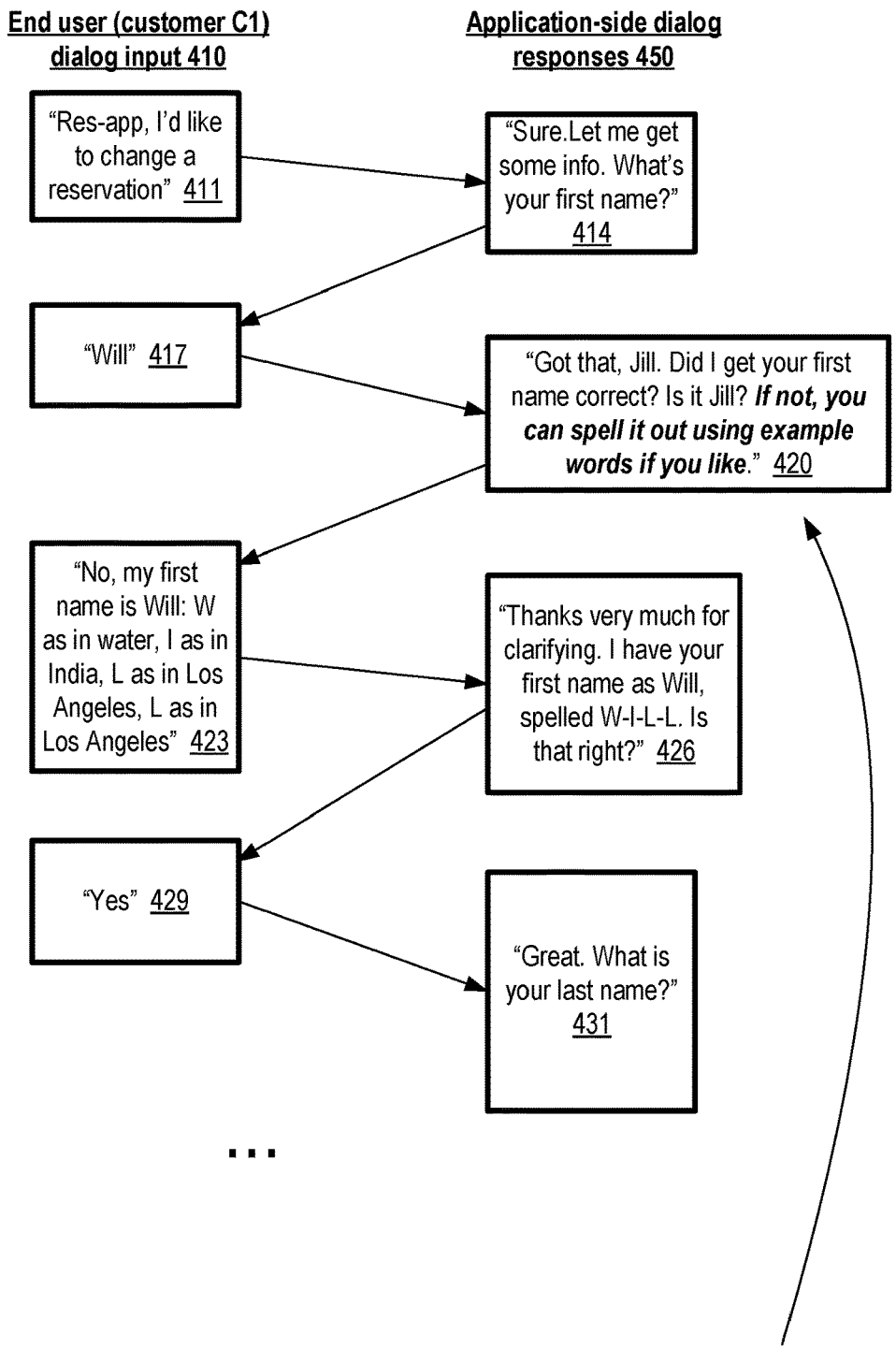
FIG. 4 illustrates an example scenario in which, if a dialog-driven application is unable to determine a value of a parameter when a particular vocal style is used by an end user, an alternative vocal style may be used to quickly ascertain the value, according to at least some embodiments.

FIG. 4 illustrates an example scenario in which, if a dialog-driven application is unable to determine a value of a parameter when a particular vocal style is used by an end user, an alternative vocal style may be used to quickly ascertain the value, according to at least some embodiments. End user dialog input 410 from a customer C1 of a dialog-driven reservation management application begins the same way as in the example shown in FIG. 3. A representation of Customer C1's first utterance 411 comprising the spoken words "Res-app, I'd like to change a reservation" is obtained at a DAMS similar in features and functionality to DAMS 102 of FIG. 1. The first response 414 among the application-side dialog responses 450 is also identical to the response illustrated in FIG. 3: the application causes the words "Sure. Let me get some info. What's your first name?" to be presented to C1. C1 replies by providing the first name "Will" 417.

The DAMS uses its analysis tools to try to understand C1's first name, and as in FIG. 3, mistakenly interprets the first name as "Jill". In contrast to the scenario shown in FIG. 3, however, response 420 presented by the application indicates to C1 that if the currently-interpreted first name Jill is incorrect, C1 can spell out the correct first name using example words if desired. Response 420 thus comprises the words "Got that, Jill. Did I get your first name correct? Is it Jill? If not, you can spell it out using example words if you like." This interaction because the dialog-driven application as executed at the DAMS is able to determine that (a) an alternative vocal input style (spell-using-example-words), as opposed to just the initial style (pronounced-words), can be used by clients to provide their used for the first name, and (b) input in this alternative vocal input style should be requested conditionally, if the interpretation generated for the input in the pronounced-words style happens to be incorrect as determined by the client. As such, the DAMS is able to present a conditional request for input in the alternate style in an appropriate sequence with respect to other styles—e.g., without immediately requesting the input to be provided in the spell-using-example-words style in the first round or turn of the conversation.

Upon hearing the words of response 420, the customer C1 decides to use the proposed alternate style in the depicted example scenario. C1's next utterance 423 comprises the words "No, my first name is Will: W as in water, I as in India, L as in Los Angeles, L as in Los Angeles". A representation of this utterance, along with a style parameter indicating that the spell-using-example-words style is being used, may be provided to the analysis tools of the DAMS, e.g., by a dialog processing orchestrator similar to DPOs 147 of FIG. 1 in some embodiments. The parameter specifying the style may help the back-end analysis subsystem of the DAMS to choose the most appropriate versions of the ASR and/or NLU models and programs for interpreting C1's input in various embodiments. Some ASR or NLU tools may be optimized for pronounced-word input, while others may be optimized for pronounce-each-letter-separately, spell-using-example-words or other styles. Note that even if a parameter specifying the style is not passed to the analysis tools, the client's utterance may nevertheless be interpreted correctly at the DAMS in at least some embodiments, e.g., by trying out different versions of the tools in sequence, or several versions of the tools in parallel.

The spell-using-example-words approach may reduce the probability of misinterpretation considerably in the depicted embodiment. In some embodiments, even the example words used may be selected according to a well-known or standardized approach to further reduce the chances of incorrect interpretation; e.g., the NATO (North Atlantic Treaty Organization) phonetic alphabet (in which A is expressed using the example word Alfa, B is expressed using the example word Beta, C is expressed using the example word Charlie etc.) may be used for communication in one set of languages including English, while other standardized approaches may be used for other languages. After C1 has spelled out the first name "Will" using example words, and "Will" has been identified as the first name by the analysis tools, the next utterance 426 from the DAMS may request a confirmation of the first name, as in "Thanks very much for classifying. I have your first name as Will, spelled W, I, L, L. Is that right?" If the customer C1 confirms, e.g., by saying "Yes" as shown in element 429, the dialog-driven application can proceed to determining the next parameter of the application or intent. For example, the utterance "Great. What is your last name?" 431 may be presented to the customer C1 in the embodiment depicted in FIG. 4. Instead of repeatedly requesting input in the same style, the DAMS can offer to accept input in alternative vocal styles as shown in FIG. 4, which can help capture correct parameter values more quickly and reduce end-user frustration in at least some embodiments.

Figure 5:
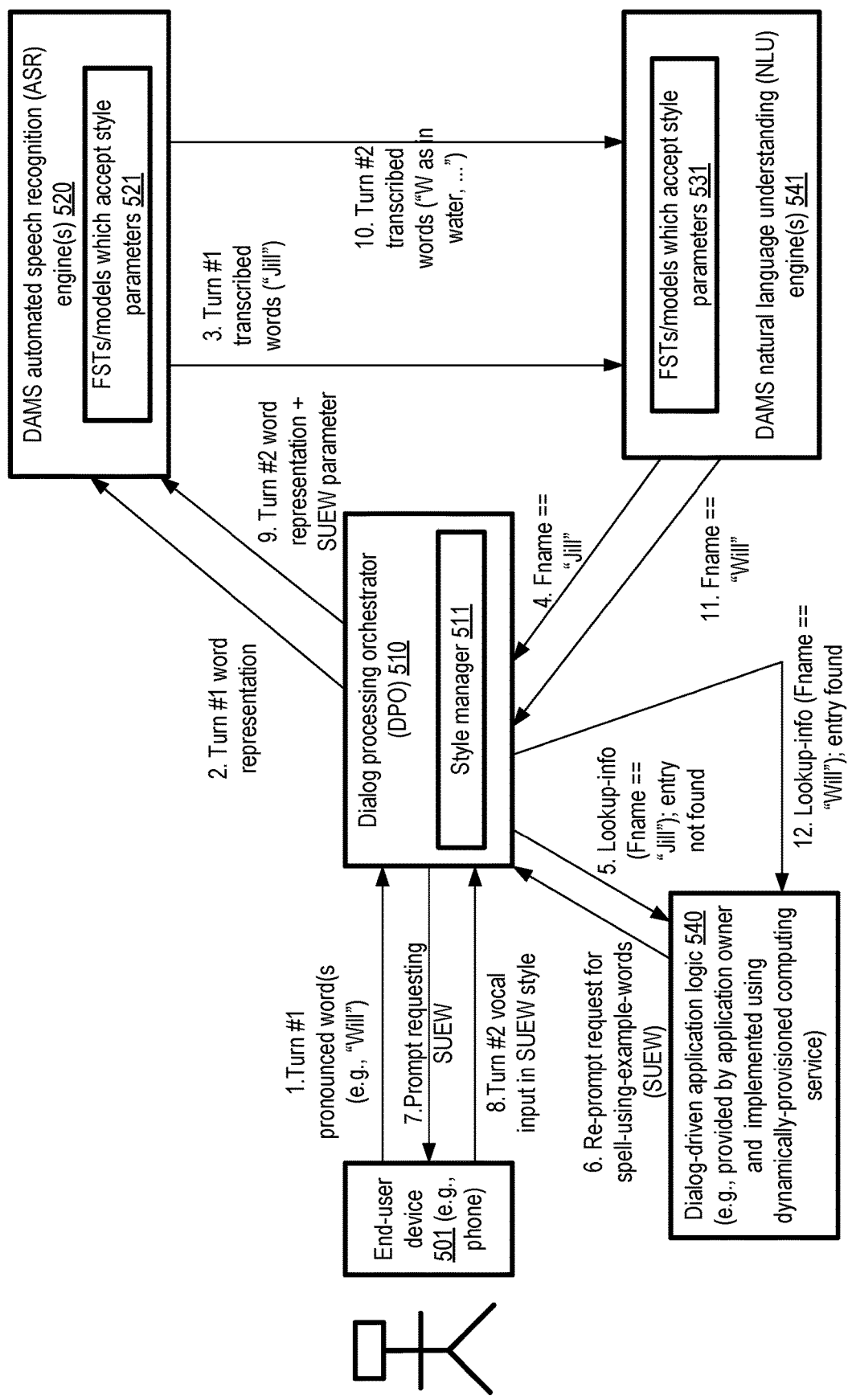
FIG. 5 illustrates example interactions between components of a dialog-driven application service which supports alternative vocal input styles, according to at least some embodiments.

FIG. 5 illustrates example interactions between components of a dialog-driven application service which supports alternative vocal input styles, according to at least some embodiments. In the embodiment shown in FIG. 5, a dialog processing orchestrator (DPO) 510 coordinates the processing of dialog elements between an end user and components of a dialog-driven application that are implemented at a DAMS similar to DAMS 102 of FIG. 1. The end-user's input is transmitted to the DAMS via an end-user device 501 (e.g., a phone) which includes an audio capture device (e.g., a microphone), an audio rendering device (e.g., a speaker) as well as software programs that manage transmission and processing of messages to and from the DAMS. In the embodiment depicted in FIG. 5, a portion of the dialog-driven application's logic 540, which may have been provided by the owner/developer of the dialog-driven application, may be implemented using a dynamically-provisioned computing service of a provider network. The developer of the dialog-driven application may, for example, define functions to be executed at such a computing service at various stages of the interactions to implement the appropriate portion of application logic. The functions may be passed to the dynamically-provisioned computing service, where they may be executed on demand without requiring specific computing resources to be acquired in advance. For example, if a client of the dialog-driven application provides a reservation identifier, a function executed at the dynamically-provisioned computing service may attempt to look up the reservation identifier in a database used by the application, and take the actions requested by the client with respect to the corresponding reservation.

The sequence in which various interactions occur in the example scenario of FIG. 5 is indicated by the initial integer (e.g., 1., 2., etc.) in the label of the arrow representing the interaction. In the first interaction labeled "1", a representation of a set of pronounced words (e.g., the word "Will") of a first turn (Turn #1) or attempt to determine the first name of an end user is received at DPO 510. The DPO passes the Turn #1 word representation to a DAMS ASR engine 520 in the depicted embodiment, as indicated by the arrow labeled 2. In at least some embodiments, a style manager component 511 of the DPO may be able to determine (e.g., based on the contents of the dialog-driven application and the fact that this is the first turn) that the pronounced-word style is being used by the end user, and a parameter indicating the pronounced-word style may be passed to the DAMS ASR engine as well. The ASR engine 520 may include one or more FSTs (finite state transducers), statistical n-gram models and/or neural network models which accept style parameters 521 in the depicted embodiment; that is, the FSTs/models may use information provided by the DPO about the style being used to try to interpret the contents of the end user's input.

In the example shown in FIG. 5, the ASR engine mistakenly transcribes the end-user input as "Jill" instead of "Will", and sends a message (labeled 3) comprising "Jill" to the DAMS NLU engine(s) 541. Note that in some embodiments, instead of sending the transcribed words directly to the NLU engine(s), the ASR engine may send the message using the DPO as an intermediary. The NLU engine may also include FSTs and/or models that accept style parameters 531. The NLU engine may recognize the entity represented by the transcribed input (the first name of the end user), and resolve the end-user input to determine that the first name is currently interpreted as "Jill". A message labeled 4 in FIG. 5, indicating that the word Jill has been identified as the value of an fname (first name) parameter, may be sent from the NLU engine to the DPO.

The DPO may request the dialog-driven application logic 540 to perform a lookup (within a database of first names, set up for the dialog-driven application) for a first name "Jill", as indicated by the arrow labeled 5. The lookup fails in the depicted example, as there is no entry for "Jill" in the first name database. Accordingly, the dialog-driven application logic 540 may generate a re-prompt request and send it to the DPO. The re-prompt request (labeled 6) may indicate that the end user should be asked to provide the first name using the spell-using-example-words (SUEW) style. Such a prompt may be synthesized and sent to the end user device 501, as indicated by the arrow labeled 7. The end-user may respond to the prompt in the requested vocal style (SUEW), as indicated by the arrow labeled, as part of the $2^{nd}$ turn (turn #2) of the process for specifying the first name. For example, the end-user may say something similar to "W as in water, I as in India, L as in Los Angeles, L as in Los Angeles".

A representation of this sequence of words, along with an indication that the SUEW style is being used, may be sent from the DPO to the ASR engine in the depicted embodiment, as indicated by the arrow labeled 9. The ASR engine may transcribe the words said by the end user in the $2^{nd}$ turn (turn #2), and send them on to the NLU engine, as indicated by the arrow labeled 10. The NLU engine may be able to determine, from the transcribed words, that the first name of the end user is "Will", and may send this information to the DPO as indicated by the arrow labeled 11. The DPO may request the lookup of the first name Will (corresponding to the arrow labeled 12). This time, the entry for the first name "Will" may be found, and no more turns may be needed for determining the first name. Similar sequences of interactions may be performed for subsequent parameters such as the end user's last name, the end user's email address, a reservation code etc. depending on the specific application being executed. As shown in FIG. 5, subcomponents of the DPO, the ASR engine(s), the NLU engine(s) as well as the dialog-driven application logic may all work together to support alternative vocal input styles in at least some embodiments.

Figure 6:
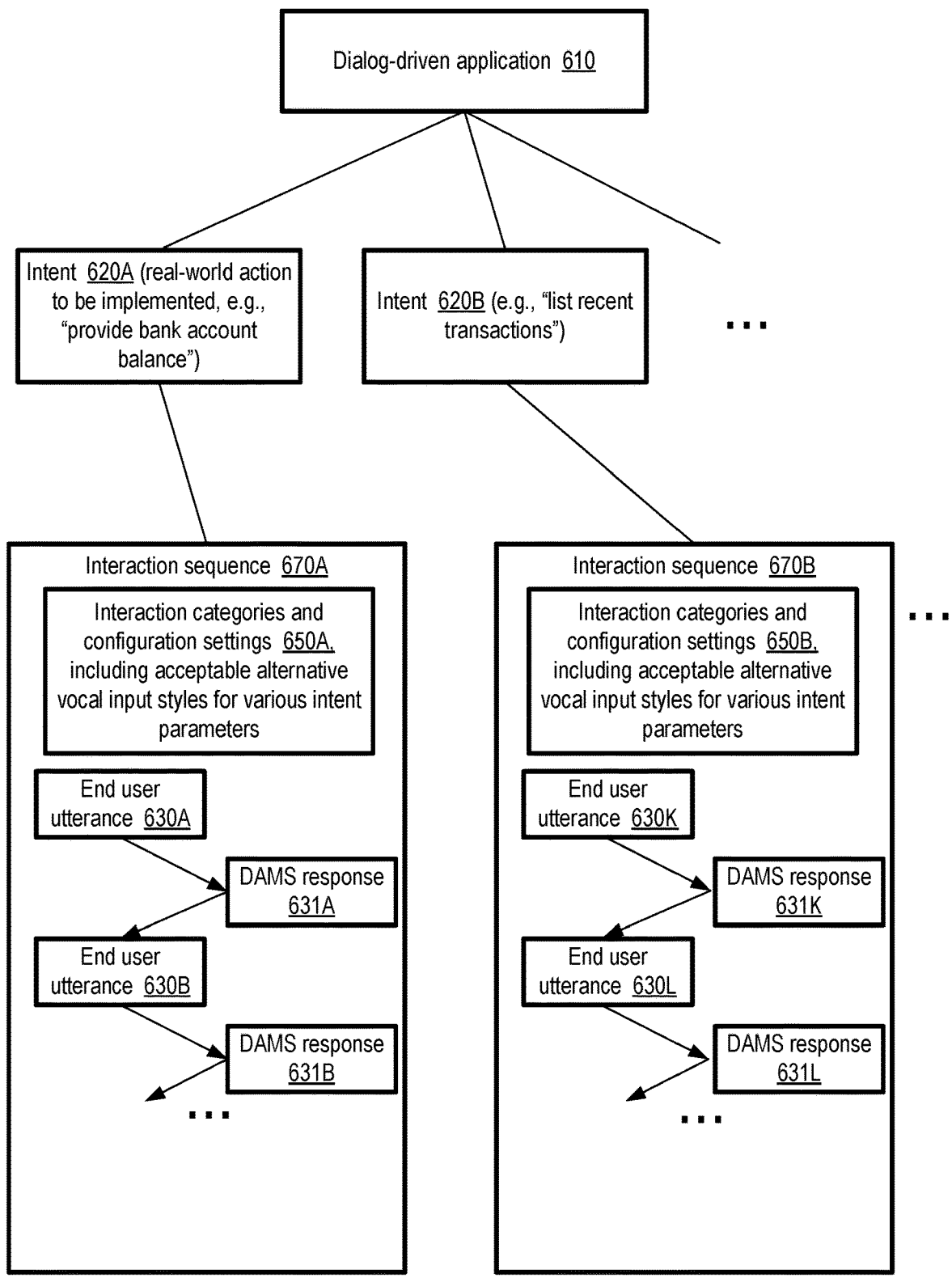
FIG. 6 illustrates an example of a dialog-driven application with customized configuration of interactions associated with respective intents, according to at least some embodiments.

Generally speaking, a given dialog-driven application may be used to fulfil a variety of related intents; each intent in turn may require the analysis of user-generated input for one or more categories of interactions, and configuration settings including settings for alternative acceptable vocal input styles may be chosen for some interaction categories (and even for individual intent parameters) independently of those chosen for other categories. FIG. 6 illustrates an example of a dialog-driven application with customized configuration of interactions associated with respective intents, according to at least some embodiments. In the embodiment depicted in FIG. 6, dialog-driven application 610 is designed to execute a plurality of intents such as intent 620A and intent 620B. Intent 620A may correspond to a first real-world task or action to be implemented on behalf of an end user of the application 610, such as the equivalent of "provide bank account balance", while intent 620B may correspond to a different real-world task or action to be implemented on behalf of an end user, such as the equivalent of "list recent transactions".

In order to fulfill the intent 610A, an interaction sequence 670A may be used to obtain the parameters needed, while a different interaction sequence 670B may be used to obtain the parameters needed to fulfill intent 610B. Each interaction sequence may comprise some number of end user utterances 630, each typically followed by a DAMS response 631. For example, interaction sequence 670A may include end user utterance 630A, followed by DAMS response 631A, end user utterance 630B and DAMS response 631B in that order, while interaction sequence 670B may include end user utterance 630K, followed by DAMS response 631K, end user utterance 630L and DAMS response 631L in that order. Note that the term "utterance" is used herein to refer to a logically connected set of user-generated input expected by a dialog-driven application based on the application's logic at a particular phase or stage of an interaction sequence, and is not limited to input provided in audio or verbal format alone—e.g., a given utterance may include audio, text, DTMF and/or other forms of input in at least some embodiments.

In the embodiment depicted in FIG. 6, the interactions of an interaction sequence 670 may be classified into one or more categories, with individual ones of the categories comprising one or more end user utterances and one or more DASM responses. Metadata indicating the interaction categories and associated configuration settings 650 (e.g., 650A or 650B), such as alternative vocal input styles for individual parameters, timing parameters (such as the maximum amount of time that the DMAS is expected to wait for input before re-prompting an end user) etc., may be stored in an application metadata repository similar to repository 116 of FIG. 1 in the depicted embodiment. As it receives and processes the user-generated input for a given intent of a given dialog-driven application, a DAMS server may use such metadata to identify the current interaction category and applicable configuration settings in various embodiments, and take actions (such as requesting responses in alternative vocal input styles in a particular sequence, or based on specified rules) accordingly.

Figure 7:
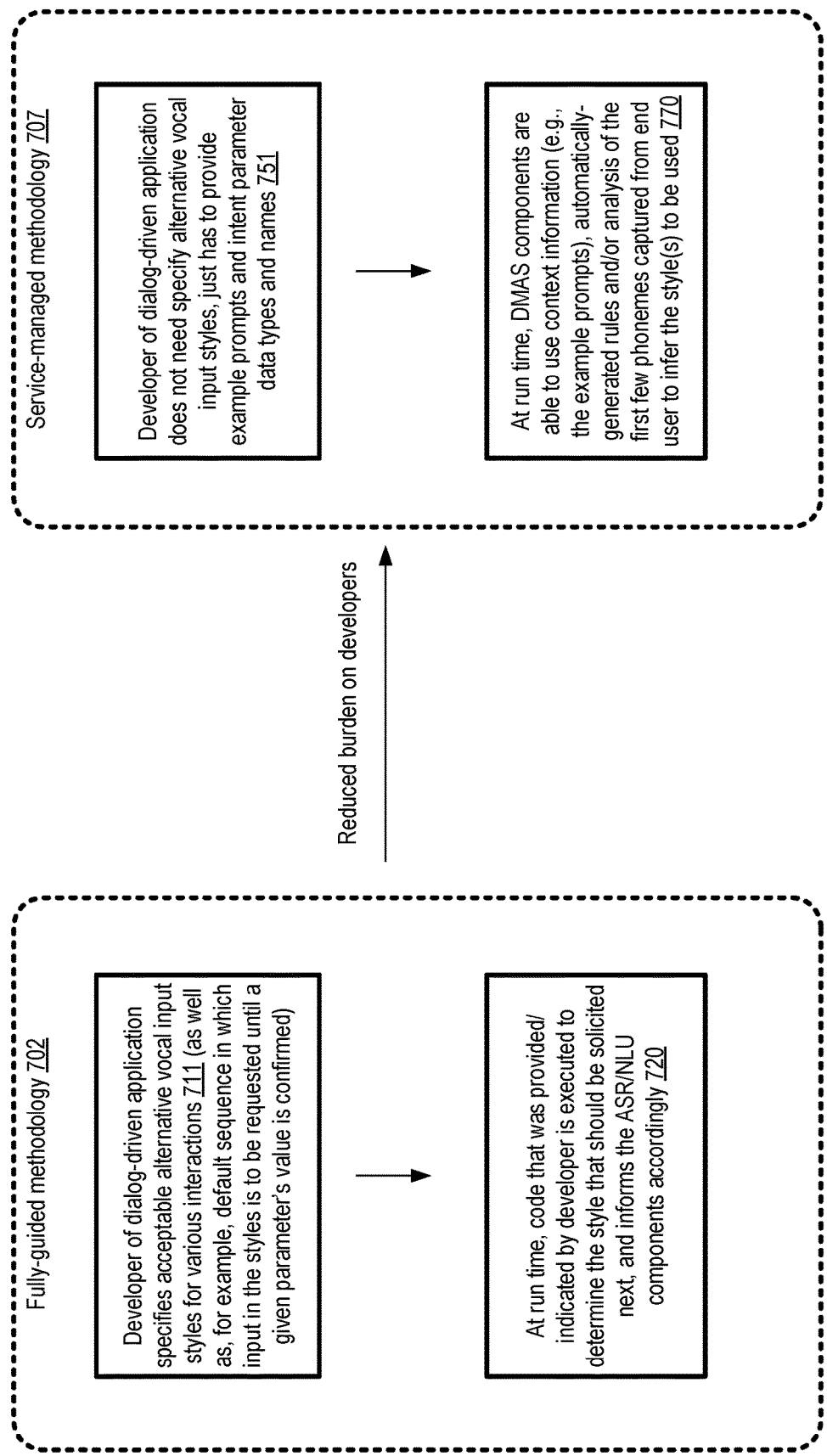
FIG. 7 illustrates example levels of guidance that may be provided by developers of dialog-driven applications with respect to alternative vocal input styles, according to at least some embodiments.

FIG. 7 illustrates example levels of guidance that may be provided by developers of dialog-driven applications with respect to alternative vocal input styles, according to at least some embodiments. Some developers of dialog-driven applications may wish to exert fine-grained control over the kinds of input that are considered acceptable for various intents and intent parameters. Such developers may opt to use the fully-guided methodology 702 for managing alternative vocal input styles. In this style, a developer specified acceptable alternate vocal input styles for various interactions 711 of the application. The developer may also provide a default sequence in which input in the alternative styles should be solicited or requested from the end users for each parameter, until the parameter value is eventually determined. At run time in the fully-guided methodology 702, code that was provided or indicated by the developer may be executed to determine the style that should be solicited next, as shown in element 720, and an indication of the style may be provided to the ASR/NLU tools being used.

The fully-guided methodology may place the burden of deciding which styles should be used at each stage of the dialog-driven application on the developers. Developers who do not wish to provide such fine-grained directions may instead opt to use a less-guided methodology referred to as a service-managed methodology 707. In this approach, as indicated in element 751, a developer need not necessarily specify alternative vocal input styles for each and every interaction; instead, the developer may simply provide example prompts to be used to solicit input for various stages of the application, as well as the data types and names of intent parameters. At run time, as indicated in element 770, DMAS components may use context information (e.g., the example prompts), automatically-generated rules and/or analysis of the initial few phonemes provided as input by an end user to infer the styles that can be used for determining values of intent parameters. The service-managed methodology may reduce the workload of application developers substantially, with the tradeoff that in a few cases the service may end up soliciting input using a style that the developer may not have wanted used.

Figure 8:
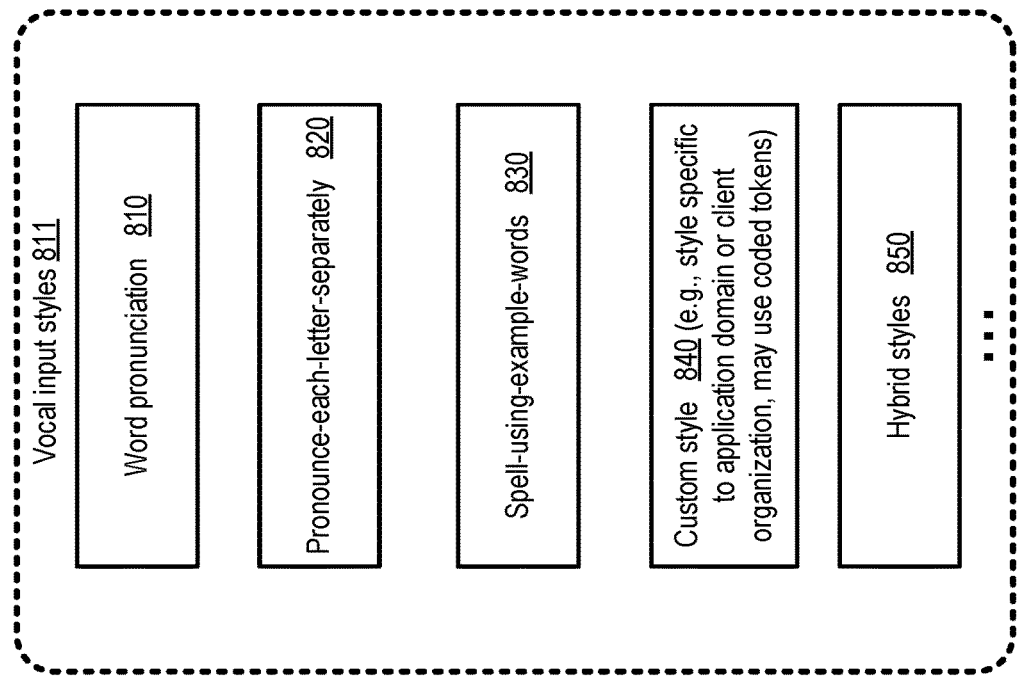
FIG. 8 illustrates example parameter data types and associated vocal input styles that can be used for dialog-driven applications, according to at least some embodiments.
Figure 8:
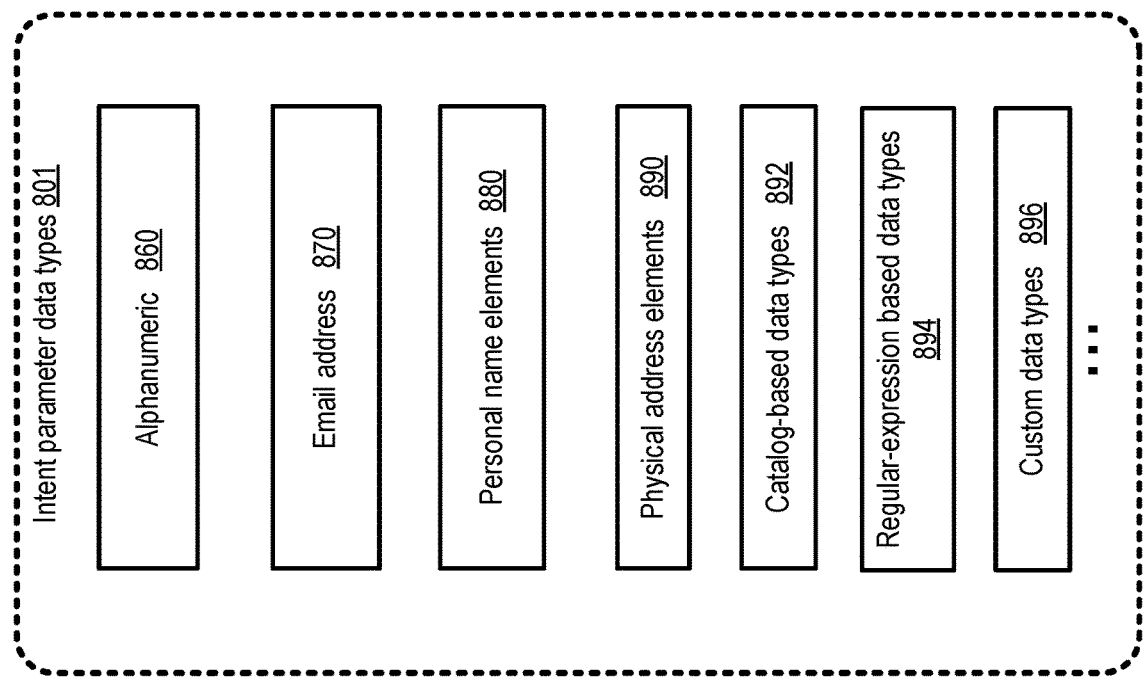

FIG. 8 illustrates example parameter data types and associated vocal input styles that can be used for dialog-driven applications, according to at least some embodiments. Intent parameter data types 801 for at least some of which multiple vocal input styles may be supported at a DAMS similar in features and functionality to DAMS 102 of FIG. 1 may include, among others, alphanumeric 860, email address 870, personal name elements 880 (such as first name, middle name, last name etc.), physical address elements 890 (such as street address, neighborhood name, city, state, postal codes, and the like), catalog-based data types 892, regular expression based data types 894, or custom data types 896. A catalog-based data type may, for example, be defined by a client of the DMAS by providing a catalog of acceptable strings, such that any string that is a member of the catalog qualifies as a valid value of a parameter value of that data type, while any string that is not a member of the catalog does not qualify as a valid parameter value. A DAMS client may specify a regular expression to define a data type 894, such that any string that matches the regular expression qualifies as a valid value of a parameter of the data type 894. In at least one embodiment, a client may define additional custom data types 896, e.g., by providing a function or a program that can be executed to determine whether a specified string is a valid value for a parameter.

For at least some of the intent parameter data types 801, several different alternative vocal input styles 811 may be used by a client or end user to provide a parameter value. The alternative vocal input styles 811 may include word pronunciation 810 (in which the end user uses normal speech to indicate the parameter, by pronouncing a word at a time without separately pronouncing individual letters of the word), pronounce-each-letter-separately 820, spell-using-example-words 830, custom styles 840 and/or hybrid styles 850. In the pronounce-each-letter-separately style, each letter of the words making up a parameter may be enunciated separately as described earlier. In the spell-using-example-words style, formulations similar to "A as in America, B as in Brazil, . . . " or simply "America, Brazil . . . " may be used to indicate the sequence of letters making up a parameter value. Note that when a parameter, such as a reservation code, includes both letters and numbers, the numbers may be enunciated either one at a time (e.g., "Two-three-three" for 233) or by including counting units such as hundred, thousand etc. (e.g., "Two hundred and thirty-three" for 233) in several of the styles. A custom style 840 may be created or defined by a developer or owner of a dialog-driven application in some embodiments, which is tied to a particular problem domain of the application and may use coded tokens associated with the problem domain. For example, for an application in which products being developed at an organization are discussed, the organization's internal code names for projects or internal terminology for expressing deadlines, budgets etc. may be vocalized and interpreted by the application as examples of a custom style. A hybrid style 850 may combine elements of other styles—e.g., a hybrid of pronounce-each-letter-separately and spell-using-example-words may allow input of the form "A, B, A, C as in California, U, S as in San Francisco" to express the parameter "abacus". Other data types and associated vocal input styles, not shown in FIG. 8, may be supported in some embodiments.

Figure 9:
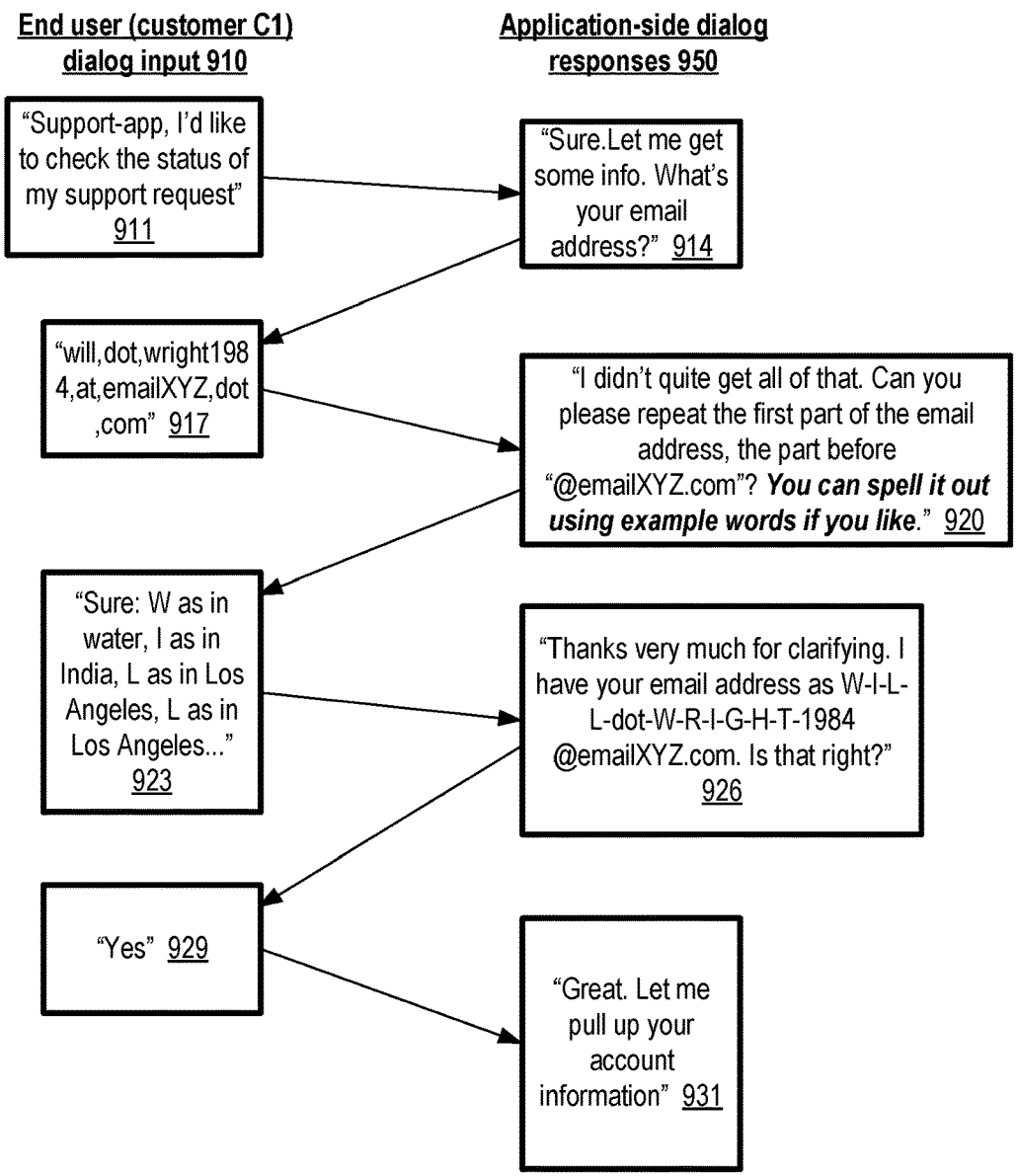
FIG. 9 illustrates an example set of interactions in which a dialog-driven application may request an end user to provide a portion of a parameter in an alternative vocal input style, according to at least some embodiments.

In various embodiments, for some parameters the DAMS may be able to correctly determine part of a parameter value, while requiring additional input from the client to determine the remainder of the parameter value. Instead of requesting that the entire parameter be re-supplied, the DAMS may only request the part that is yet to be ascertained in at least some embodiments. FIG. 9 illustrates an example set of interactions in which a dialog-driven application may request an end user to provide a portion of a parameter in an alternative vocal input style, according to at least some embodiments. Customer C1's dialog input 910 directed to a customer-support application may begin with the utterance "Support-app, I'd like to check the status of my support request" 911. The application-side dialog responses 950 may begin with a request for an email address associated with the support request: "Sure. Let me get some info. What's your email address?" 914.

Customer C1 may pronounce the email address using complete words for the portion before the "@" symbol of the email address, and expressing punctuation symbols using words (such as dot for "."), as in "will, dot,wright1984,at, emailXYZ,dot,com" 917. This utterance may be analyzed at the DAMS, and the portion after the "at" symbol may be interpreted with a high degree of confidence in the depicted example. However, the portion before the "at" symbol may not be interpreted with a similar confidence level. As a result, the DAMS may request C1 to specify the low-confidence portion of the email address using one of the supported alternative vocal input styles (such as spell-using-example-words). For example, the utterance 920 comprising "I didn't quite get all of that. Can you please repeat the first part of the email address, the part before "@emailXYZ. com" ? You can spell it out using example words if you like".

Customer C1 may respond with an utterance 923 complying with the request, such as "Sure. W as in water, I as in India, L as in Los Angeles, . . . ". This time, because of the use of the example words, the confidence level of the interpretation generated at the DAMS may be much higher. The DAMS may eventually request C1 to confirm the email address, e.g., by presenting the utterance 926: "Thanks very much for clarifying. I have your email address as W-I-L-L-dot-W-R-I-G-H-T1984@emailXYZ.com. Is that right?" After C1 confirms that the email address has been captured correctly, using utterance 929, the DAMS may proceed to other parts of the application logic, such as by looking up account information associated with the email address as indicated in element 931. Note that in this example the DAMS itself may use one of the alternative vocal input styles (spell-each-letter-separately) to present the email address for confirmation. Had the DAMS requested the entire email address, the customer may not have been as satisfied with the interaction, especially if the email provider "emailXYZ.com" is very well known, and if the name of the email provider is unlikely to be mistaken for the names of other email providers.

Figure 10:
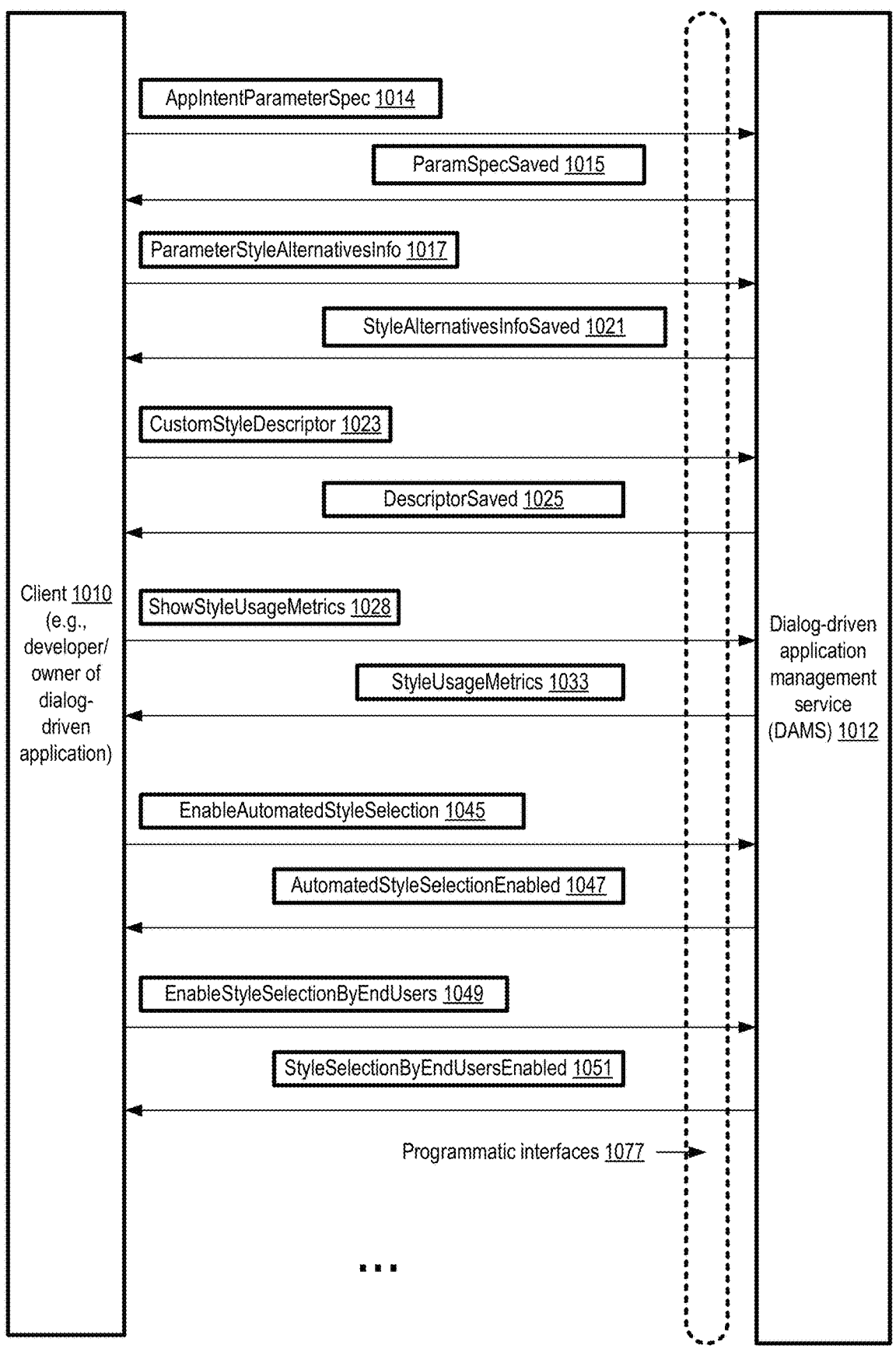
FIG. 10 illustrates example programmatic interactions associated with configuration of dialog-driven applications, according to at least some embodiments.

In various embodiments developers, owners or administrators of dialog-driven applications may provide input via programmatic interfaces to the DAMS regarding various aspects of the handling of alternative vocal input styles. FIG. 10 illustrates example programmatic interactions associated with configuration of dialog-driven applications, according to at least some embodiments. DAMS 1012, similar in features and functionality to DAMS 102 of FIG. 1, may implement programmatic interfaces 1077, such as one or more web-based consoles, command-line tools, application programming interfaces (APIs) and/or graphical user interfaces enabling clients 1010 such as a developer of a dialog-driven application to submit messages/requests and receive corresponding responses in the depicted embodiment. The messages may be processed at least partly at control plane components of the DAMS in various embodiments.

The client 1010 may provide information about one or more parameters of a given intent of a dialog-driven application via one or more AppIntentParameterSpec messages 1014 in some embodiments. The AppIntentParameterSpec message may provide a name of a parameter (e.g., "fname" for a first name) of an intent, the data type (e.g., alphanumeric), example prompts/utterances that may be used to solicit the value of the parameter (e.g., "Can you please tell me your first name?"), and so on. The DAMS 1012 may save the information provided about the parameter specification and send a ParamSpecSaved message 1015 to the client in some embodiments.

In at least one embodiment, the client may include information about preferred or permitted alternative vocal input styles for a parameter in the AppIntentParameterSpec message. In other embodiments, information about the styles (e.g., including the list of styles, a default sequence in which input in the different styles should be requested if needed, example prompts to request input in the different style, whether requests should be for the entire parameter or for a portion which has not been determined with a desired confidence level, and so on) may instead be provided in a separate ParameterStyleAlternativesInfo message 1017. In some cases, the client may decide to permit the use of the same set of alternative styles and/or the same default sequence for several different parameters, and a single ParameterStyleAlternativesInfo message 1017 may specify the common style information about the multiple parameters. The style information may be saved at the DAMS 1012, e.g., as part of an application metadata repository similar to repository 116 of FIG. 1, and a StyleAlternativesInfoSaved message 1021 may be sent to the client in some embodiments.

A client may define a custom vocal style, e.g., by providing a style name, a brief description of the style, and a set of example uses of the style (along with the corresponding interpretation of parameter values specified in the examples) in a CustomStyleDescriptor message 1023 in some embodiments. A custom style may for example include the use of organization-specific tokens or coding schemes, or application domain-specific tokens or coding schemes (for example, schemes in which the Unicode symbol for a character is used to specify the character), which can be translated if needed to interpret the parameter values as part of the ASR/NLU operations performed at the DAMS in some embodiments. After the descriptor of the custom style is saved at the DAMS, a DescriptorSaved message 1025 may be sent to the client. In some embodiments, the DAMS may automatically train ASR/NLU tools or models to be used to interpret the custom style (e.g., using or extending the examples provided in the descriptor), and deploy such tools for the dialog-driven application for which the custom style is specified.

In some embodiments, a client 1010 may be interested in viewing style-specific metrics, such as the fraction of cases in which determining an intent parameter required the use of input in multiple styles during the executions of a dialog-driven application (e.g., "20% of the requests for a reservation code required input in more than one style", the fraction of times a given style was the one was used when parameter value was determined (e.g., "50% of the time, the spell-using-example-words style was the one that led to the final determination of a parameter P"), and so on. The client may issue a ShowStyleUsageMetrics request 1038 in some embodiments to obtain such metrics. Such metrics may be collected, for example, by metric managers at the DMAS during application execution, which may be implemented as part of dialog processing orchestrators or other DMAS components of the kind discussed above. Such metrics may help the client to improve the design of the applications, e.g., by more quickly soliciting input in the style most likely to succeed in identifying the parameter in a new version of the application. The available metrics may be provided via one or more StyleUsageMetrics messages 1033 in various embodiments.

A client 1010 may permit the DMAS to automatically select the styles (and/or the solicitation sequence) to be used for one or more parameters of an application or intent by submitting an EnableAutomatedStyleSelection request 1045 in the depicted embodiment. In response, the DMAS may store metadata indicating that alternative vocal input styles are to be chosen by the DMAS for one or more specified parameters, without relying on the client to provide any additional guidance specific to the styles, and send an AutomatedStyleSelectionEnabled message 1047 to the client. Messages may be sent from the DMAS control plane to the dialog processing orchestrators, ASR engines and/or NLU engines indicating that code/programs that can automatically choose alternative styles when needed for the application should be executed in the depicted embodiment for the application.

In at least one embodiment, as mentioned earlier, a list or collection of alternative vocal input styles acceptable for a parameter or multiple parameters of an application may be presented to an end user of an application at the request of a client 1010, and the end user may be allowed to choose the particular style they wish to use. An EnableStyleSelectionByEndUsers message 1049 may be sent by the client to turn on this type of functionality at the DMAS for one or more applications or portions of an application. Metadata indicating that style selection by end users is to be permitted may be stored at the DMAS, and a StyleSelectionByEndUsersEnabled message 1051 may be sent to the client in the depicted embodiment. In at least one embodiment, if a client-side component such as a cell phone application is utilized for capturing input from end users for a dialog-driven application, an end user may store preferred styles as part of the settings of the client-side components. Note that in some embodiments, programmatic interactions pertaining to alternative vocal input styles, other than the kinds of interactions shown in FIG. 10, may be supported by a DAMS.

Figure 11:
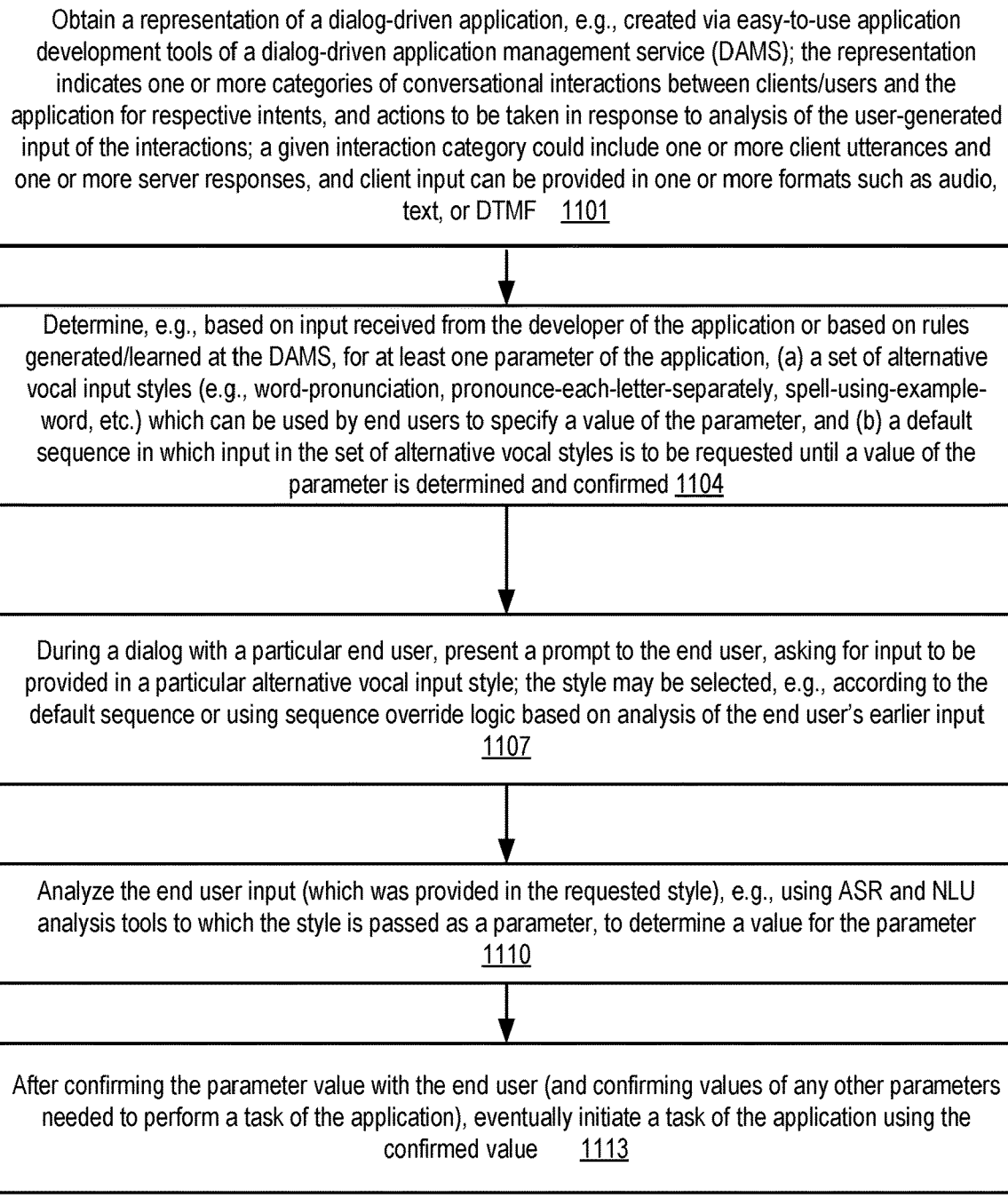
FIG. 11 is a flow diagram illustrating aspects of operations which may be performed at a dialog-driven application management service which allows submission of end user input using alternative vocal input styles, according to at least some embodiments.

FIG. 11 is a flow diagram illustrating aspects of operations which may be performed at a dialog-driven application management service which allows submission of end user input using alternative vocal input styles, according to at least some embodiments. As shown in element 1101, a representation of a dialog-driven application, e.g., created via easy-to-use application development tools (e.g., tools in which example utterances/prompts are provided by the developer for various interactions, without having to write code for managing the utterances) of a dialog-driven application management service (DAMS) may be obtained in the depicted embodiment. The representation may indicate one or more categories of conversational interactions between clients/users and the application for respective intents (goals of the end user, such as changing a reservation, specifying a customer support complaint, etc.), and actions to be taken in response to analysis of the user-generated input of the interactions. A given interaction category may include one or more client utterances and one or more server responses, and client input can be provided in one or more formats such as audio, text, or DTMF in at least some embodiments.

The DAMS may determine, e.g., based on rules indicated in input received from the developer of the application or based on rules generated/learned at the DAMS in some embodiments, a set of alternative vocal input styles (e.g., word-pronunciation, pronounce-each-letter-separately, spell-using-example-words, etc.) which can be used by end users to specify a value of a parameter of the application (element 1104). In addition, in some embodiments, a default sequence in which input in the set of alternative vocal styles is to be requested until a value of the parameter is determined and confirmed may also be determined. For example, a default sequence for determining a value of a parameter P1 of a dialog-driven application may comprise using the word-pronunciation style first, followed by pronounce-each-letter-separately of the parameter value hasn't been determined successfully, followed by spell-using-example-words, and so on. In some embodiments, the default sequence for soliciting input about a parameter may include a non-vocal mode of communication as well—e.g., in the above example, a developer may specify that if the value of P1 cannot be determined even after the spell-using-example-words style is employed, the end user should be asked to specify the parameter value by text message or using DTMF tones if available.

During an execution of the application, various prompts may be presented to an end user to solicit input needed to perform tasks of the application. Input in a particular alternative vocal style may be solicited for a particular parameter, e.g., according to the default sequence associated with the parameter (element 1107). In some cases, the default sequence may be overridden, using override logic which responds to earlier input provided by the end user and determines that an alternative vocal input style which is not the one indicated in the default sequence should bs used. For example, consider an example scenario in which the DAMS is able to determine that for an earlier-determined parameter (e.g., a first name), the end user was able to specify the value only after the spell-using-example-words style was used, despite an attempt to use the pronounce-each-letter-separately style. Then, if the end user has to specify a last name, and the default sequence indicates that the next style to be used should be pronounce-each-letter-separately, the DMAS may decide to override the default sequence and solicit input in the spell-using-example-words style instead.

The input provided by the end user in the requested style may then be processed, e.g., using a variety of analysis tools including ASR engines, NLU engines and the like to which an indication of the requested style is passed or provided (element 1110) in the depicted embodiment. Upon receiving an indication of the style, the ASR and NLU components may be able to choose a specific program or model (e.g., a finite state transducer, a statistical n-gram model, a machine learning model such as a deep neural network model, etc.) which is best suited for interpreting input in that style in the depicted embodiment. The analysis may result in determining a value of the application parameter. After confirming the parameter value with the end user (and confirming other parameters, if any, needed to perform a task of the application), eventually a task of the application may be initiated using the confirmed value in various embodiments (element 1113). For example, if the parameter is a reservation code, and the pronounce-each-letter-separately style is used to determine its value, a lookup and/or modification of the corresponding reservation may be initiated after confirming at least the reservation code. It is noted that in various embodiments, some of the operations shown in the flow diagram of FIG. 11 may be implemented in a different order than that shown in the figure, or may be performed in parallel rather than sequentially. Additionally, some of the operations shown in FIG. 11 may not be required in one or more implementations.

Figure 12:
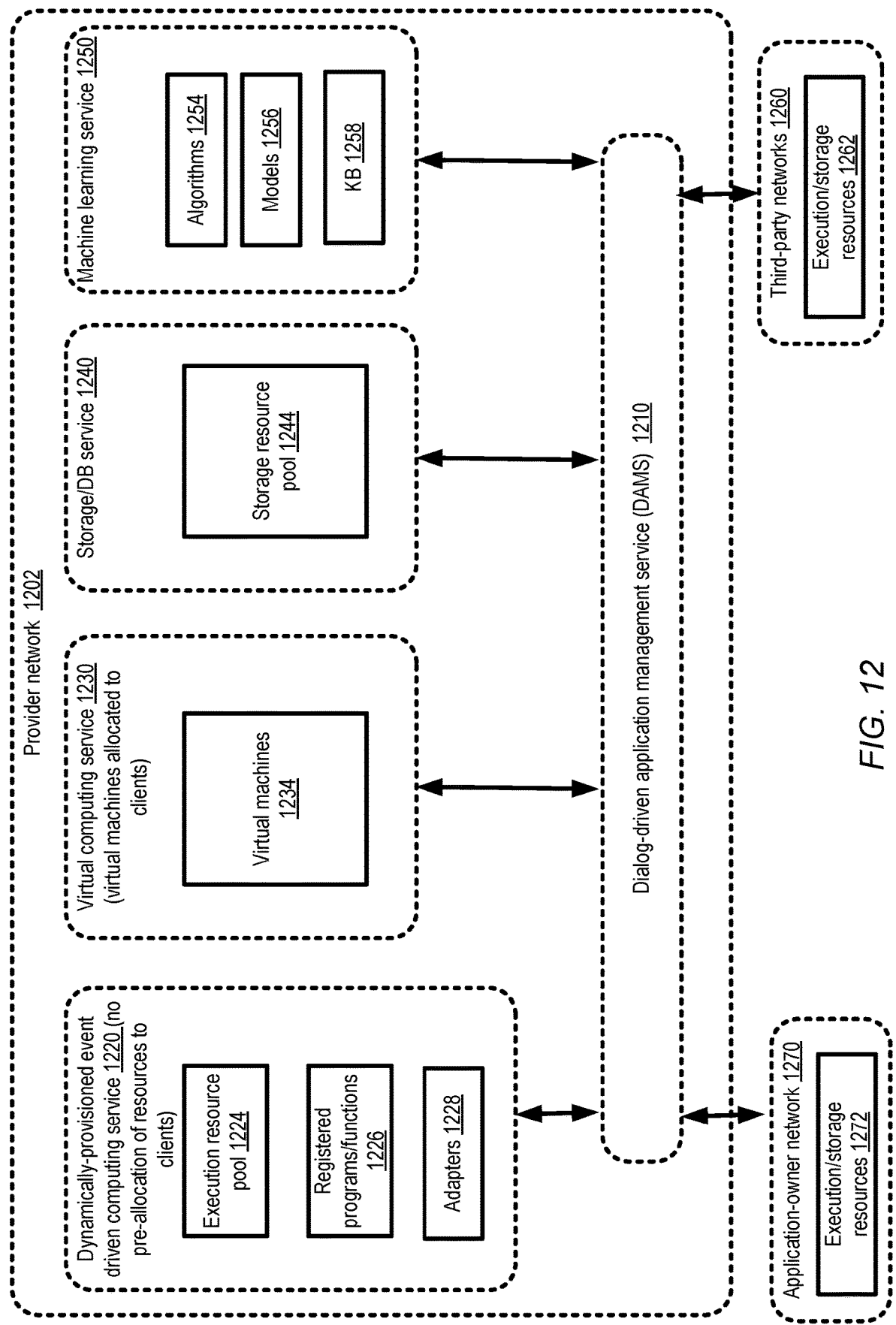
FIG. 12 illustrates an example provider network in which a dialog-driven application management service may be implemented, according to at least some embodiments.

FIG. 12 illustrates an example provider network in which a dialog-driven application management service may be implemented, according to at least some embodiments. A provider network (sometimes referred to simply as a "cloud" or as a "cloud provider network") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services. As shown, provider network 1202 may comprise a dynamically-provisioned provisioning event-driven computing service 1220, a virtualized computing service 1230, a storage or database service 1240 and a machine learning service 1250 in addition to a DAMS 1210 similar in features and functionality to DAMS 102 of FIG. 1. In the depicted embodiment, the DAMS 1210 may utilize one or more of the other services, for example to execute the tasks associated with various intents, to store dialog state information, and so on.

A dynamically-provisioned event-driven computing service 1220 may enable clients to register executable programs or functions for execution without pre-allocating execution resources for the clients (and hence may sometimes be referred to as a "server-less" computing service). A program developer may submit a program at service 1220 and indicate one or more triggering conditions or events which are to cause the execution of the program. Instead of reserving or provisioning compute resources for the client in advance, the service 1220 may simply select compute resources for a registered program 1226 from a pool 1224 of execution resources whenever execution of the program is triggered. The client may not even be aware of the kind of virtual or physical machine used to execute the program, and may simply be provided with the result of the execution. As such, clients of the dynamically-provisioned event driven computing service 1220 may not have to be concerned with identifying the number or computing capacities of platforms to be used for their programs, and may only be charged for the amount of computing actually performed when their programs are executed (measured, for example, in relatively fine-grained increments of seconds or even fractions of seconds of computation) in at least some embodiments. The dynamically-provisioned event-driven computing service 1220 may in effect implement a functional programming model in some embodiments. The computing resources offered by such a service 1220 may be an ideal fit for implementing the task fulfillment programs for intents of some kinds of dialog-driven applications, especially if the workload of the application tends to change dynamically. In the depicted embodiment, the service 1220 may also make a number of adapters 1228 accessible for the registered programs, enabling the registered programs to utilize resources external to the service 1220. As a result, a program registered for execution at service 1220 may be able to access resources, for example, at other services of the provider network and/or outside the provider network.

In contrast to the dynamically-provisioning event driven computing service 1220, the virtualized computing service 1230 may pre-allocate computing resources (e.g., virtual machines 1234) to its clients in a somewhat more static fashion, e.g., for specified time intervals, and enable the clients to run programs on the allocated virtual machines. In at least some embodiments, programs running on such virtual machines may be invoked for implementing at least some tasks of dialog-driven applications. Some such programs may implement web services interfaces, enabling a given program to be utilized (e.g., to fulfill a task intent) by transmitting commands to an HTTP (HyperText Transfer Protocol)-based address associated with the program. In some cases, a sophisticated distributed application (e.g., an application for making travel-related reservations, or for managing the workflow of customer support tasks associated with various products produced by an enterprise) may have originally been implemented at the virtualized computing service without including the necessary hooks or communication modules for dialog-driven interactions. Various infrastructure management capabilities supported at the virtualized computing service, such as automated scaling and load balancing, may be utilized for the service. The owner of the distributed application may wish to add the dialog-driven interaction components to such an application. In such a scenario, the DAMS 1210 may enable the dialog-related components to be generated and integrated with the pre-existing application without substantial additional investment of programming effort. Intent task fulfillment programs run at the virtualized computing service 1230 and/or the dynamically-provisioned event-driven computing service 1220 may invoke each other (or other programs at other services) in some embodiments—that is, a given task fulfillment program may not be restricted to utilizing resources of a given service of the provider network.

In various embodiments, one or more storage and/or database services 1240 may also be utilized for dialog-driven applications. For example, data sets used for training ASR/NLU tools, data sets used for task fulfillment, profile information for end users of dialog-driven applications, dialog state checkpoint information and the like may be stored at storage resource pools 1244 of such services. In at least one embodiment, an executable representation of a dialog-driven application may comprise invocations of programmatic interfaces of the storage or database service.

Some provider networks may include a machine learning service 1250 which can be utilized by various other services and/or by external clients directly. The machine learning service 1250 may provide natural language understanding (NLU) capabilities which in turn may depend on a combination of automated speech recognition (ASR) and natural language processing (NLP) components in the depicted embodiment. A wide variety of algorithms 1254 and models 1256 may be accessed from the machine learning service in such embodiments, including for example various classification and regression algorithms, finite state transducers, statistical n-gram models, artificial neural network-based algorithms (including deep learning neural network-based algorithms), and so on. In addition, a KB (knowledge base)

1258 which captures records of previous experiences with machine learning tasks, and which can therefore be utilized to select suitable parameters and hyper-parameters for various algorithms and models may also be implemented at the machine learning service 1250. In some embodiments, the ASR components of the machine learning service may comprise a number of finite state transducers (FSTs), associated general or user-specific language models and/or acoustic models. The ASR components may, for example, detect speech based on signals received at an end-user device associated with a dialog-driven application, transform the speech signals into text, and provide the text as input to the natural language processing components. The natural language processing components may implement, for example, algorithms for named entity recognition, intent classification, and result ranking (e.g., associating scores with end user utterances indicating the extent to which the utterances match expected word strings for various stages of the dialogs used for setting intent parameters.

For some intents of dialog-driven applications developed using DAMS 1210, fulfillment tasks may be implemented at resources outside the provider network, e.g., at execution or storage resources 1272 located within application-owner networks 1270 or at execution or storage resources 1262 located in third-party networks 1260 (e.g., networks owned or managed by a third party application vendor or service vendor, other than the entity which develops/owns the dialog-driven application and other than the provider network operator). Other resources or services inside or outside the provider network may be used for dialog-driven applications in various embodiments. In some embodiments, at least some aspects of the dialog-driven application management and configuration techniques described herein may be implemented without acquiring resources of network-accessible services such as those shown in FIG. 12.

Figure 13:
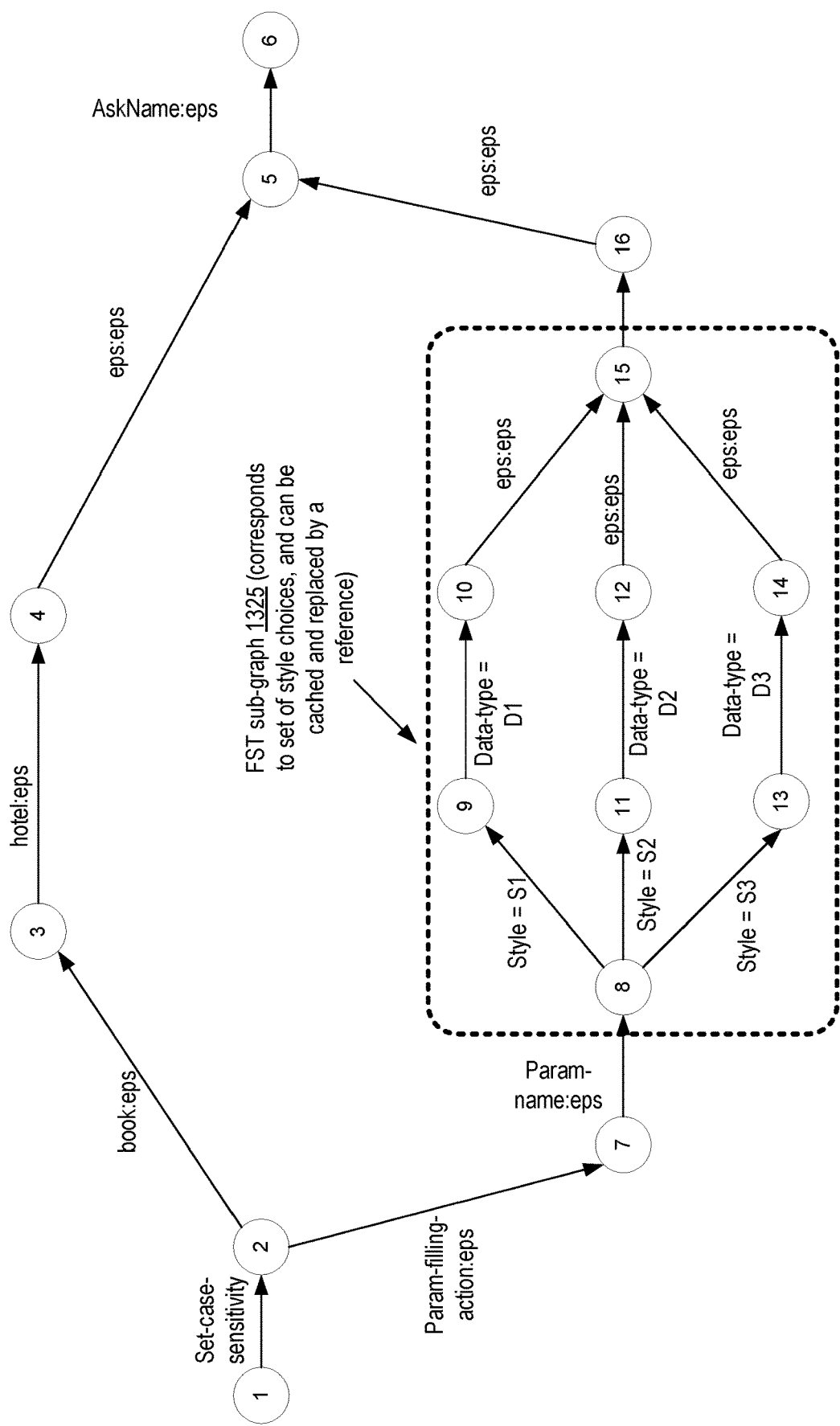
FIG. 13 illustrates a simple example finite state transducer which may be employed to process input in any of several vocal input styles, according to at least some embodiments.

FIG. 13 illustrates a simple example finite state transducer which may be employed to process input in any of several vocal input styles, according to at least some embodiments. A representation of a finite state transducer (FST) may comprise a graph with a number of nodes representing respective states of the analysis being performed (e.g., with respect to a set of vocal input obtained from an end user of a dialog-driven application) and edges representing probabilistic transitions between the states (based for example on the input components processed in each step of the analysis and/or the application settings being used for the processing at each stage). In the FST graph shown in FIG. 13, the terminology "eps" (for epsilon) is used to refer to brief gaps or silences between pronounced phonemes or terms; circles numbered 1-16 represent states or nodes, and arrows between the circles represent probabilistic transitions.

From an initial state 1, the determination of an application setting for case-sensitivity leads to state 2 with 100% probability. The example end-user utterance "book hotel" (provided by the developer of the application and therefore incorporated into the FST) leads to the traversal of the path between states 2, 3, 4, 5 and 6, with an operation ("Ask-Name") (for which a different FST may be used) being executed to determine the name of the end user after the "book hotel" utterance is analyzed, as indicated in the arrow between nodes 5 and 6.

The lower portion of the FST graph of FIG. 13 may be traversed if the example utterance "book hotel" is not used. An FST sub-graph 1325 corresponding to a set of alternative vocal style choices, and comprising the nodes/states 8, 9, 10 11, 12, 13, 14, 15 may be a common sub-graph for many FSTs in which the three styles S1, S2 and S3 (with corresponding parameter data types D1, D2 and D3) are permitted for one or more parameters. As such, for performance optimization, the sub-graph 1325 may be cached in a common in-memory repository in some embodiments, and replaced by a reference in the different FSTs which may all utilize analogous states and transitions. By caching the sub-graph associated with a common set of style choices and replacing it by a reference, in various embodiments the amount of memory and/or storage needed for the collection of FSTs used for a given dialog-driven application may be substantially reduced. The common sub-graph may be succeeded by node/state 16 which also leads to node/state 6.

Figure 14:
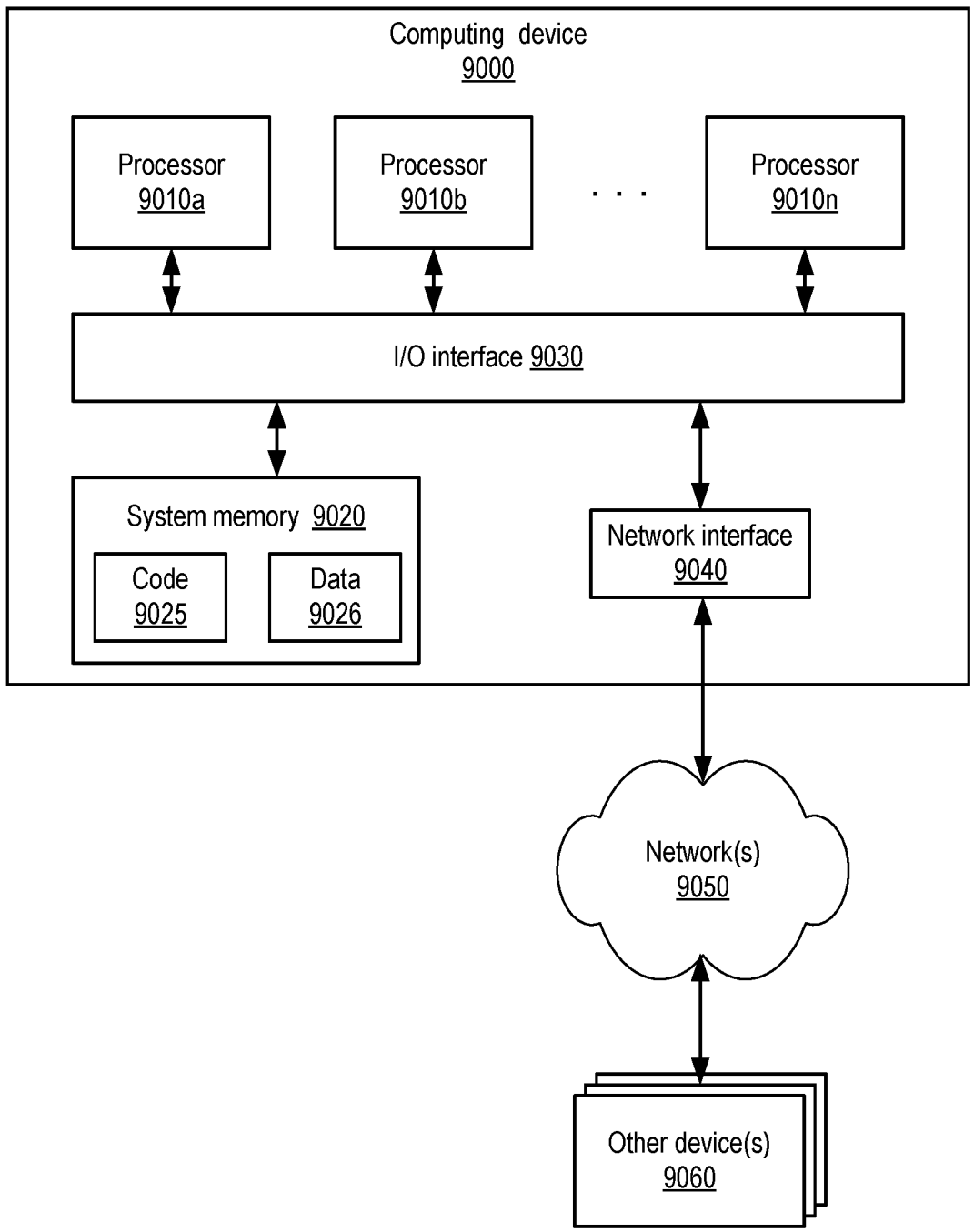
FIG. 14 is a block diagram illustrating an example computing device that may be used in at least some embodiments.

In at least some embodiments, a server that implements the types of techniques described herein (e.g., various functions of a DAMS and/or other services of a provider network), may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 13. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
determine, at a dialog-driven application management service, (a) a first set of alternative vocal input styles for specifying a value of a particular parameter of a dialog-driven application, wherein the first set of alternative vocal input styles includes a word-pronunciation style, a pronounce-each-letter-separately style and a spell-using-example-words style and (b) a default sequence, of at least a subset of alternative vocal input styles of the first set, in which input associated with the particular parameter is to be requested from a client of the dialog-driven application until a value of the particular parameter is determined;
cause to be presented, by the dialog-driven application management service during an execution of the dialog-driven application, in accordance with the default sequence, an audio prompt requesting input in a particular alternative vocal input style of the set of alternative vocal input styles;
obtain, at the dialog-driven application management service subsequent to presentation of at least a portion of the audio prompt, vocal input provided by a client of the dialog-driven application, wherein the vocal input is provided at least in part in the particular alternative vocal input style;
determine, at the dialog-driven application management service based at least in part on applying a collection of analysis tools to the vocal input provided by the client, a value of the particular parameter, wherein an indication of the particular alternative vocal input style is passed to the collection of analysis tools and utilized by the collection of analysis tools to process the vocal input; and initiate, by the dialog-driven application management service using the value of the particular parameter, a task associated with the dialog-driven application.

2. The system as recited in claim 1, wherein at least one alternative vocal input style of the set of alternative vocal input styles is determined automatically by the dialog-driven application management service without receiving an indication of the alternative vocal input style from a developer of the dialog-driven application or an owner of the dialog-driven application.

3. The system as recited in claim 1, wherein the one or more computing devices include further instructions that upon execution on or across the one or more computing devices:

determine, at the dialog-driven application management service, a second set of alternative vocal input styles for specifying a value of another parameter of a dialog-driven application, wherein the first set of alternative vocal input styles includes at least one alternative vocal style which is not a member of the second set.

4. The system as recited in claim 1, wherein the one or more computing devices include further instructions that upon execution on or across the one or more computing devices:

cause to be presented, to an end user of the dialog-driven application, an indication of a plurality of alternative vocal input styles for specifying a value of another parameter of the dialog-driven application; and determine, prior to analyzing vocal input pertaining to the other parameter, that the end user has selected a first alternative vocal input style of the plurality of alternative vocal input styles for specifying the value of the other parameter.

5. The system as recited in claim 1, wherein the collection of analysis tools comprises at least one automated speech recognition tool and at least one natural language understanding tool.

6. A computer-implemented method, comprising:

determining a set of alternative vocal input styles for specifying a value of a particular parameter of a dialog-driven application, wherein the set of alternative vocal input styles includes a pronounce-each-letter-separately style;

causing to be presented, during an execution of the dialog-driven application, an audio prompt requesting input in a particular alternative vocal input style of the set of alternative vocal input styles;

determining, based at least in part on applying a collection of analysis tools to vocal input obtained subsequent to presentation of the audio prompt, a value of the particular parameter; and initiating, using the value of the particular parameter, a task of the dialog-driven application.

7. The computer-implemented method as recited in claim 6, wherein the set of alternative vocal input styles includes one or more of: (a) a word-pronunciation style, (b) a spell-using-example-words style, or (c) a custom style associated with a problem domain of the dialog-driven application.

8. The computer-implemented method as recited in claim 6, further comprising:

obtaining an indication of a rule to be applied to determine that input in the particular alternative vocal input style is to be requested, wherein the audio prompt is generated in accordance with the rule.

9. The computer-implemented method as recited in claim 8, wherein according to the rule, the input in the particular alternative vocal input style is to be requested after an attempt to determine the value of the particular parameter based on analysis of vocal input in at least one other alternative vocal input style fails.

10. The computer-implemented method as recited in claim 8, wherein the indication of the rule is obtained via a programmatic interface from a developer of the dialog-driven application.

11. The computer-implemented method as recited in claim 6, further comprising:

obtaining an indication, via a programmatic interface from a developer of the dialog-driven application, of at least one alternative vocal input style of the set of alternative vocal input styles.

12. The computer-implemented method as recited in claim 6, wherein the particular parameter comprises a portion of one or more of: (a) a name of an end user, (b) a street address, (c) an email address, (d) a postal code, or (e) an alphanumeric identifier.

13. The computer-implemented method as recited in claim 6, wherein the collection of analysis tools comprises one or more of: (a) an automated speech recognition (ASR) tool or (b) a natural language understanding (NLU) tool.

14. The computer-implemented method as recited in claim 6, wherein the collection of analysis tools comprises one or more of: (a) a finite state transducer (FST), (b) a statistical n-gram model or (c) a neural network-based model.

15. The computer-implemented method as recited in claim 6, wherein the audio prompt indicates a successfully-interpreted portion of a previous vocal input received prior to presentation of the audio prompt, and wherein a request in the audio prompt for input in the particular alternative vocal input style pertains to a clarification of another portion of the previous vocal input.

16. One or more non-transitory computer-accessible storage media storing program instructions that when executed on or across one or more processors cause the one or more processors to:

determine a set of alternative vocal input styles for specifying a value of a particular parameter of a dialog-driven application, wherein the set of alternative vocal input styles includes a pronounce-each-letter-separately style;

cause to be presented, during an execution of the dialog-driven application, an audio prompt requesting input in a particular alternative vocal input style of the set of alternative vocal input styles;

determine, based at least in part on applying a collection of analysis tools to vocal input obtained subsequent to presentation of the audio prompt, a value of the particular parameter; and initiate, using the value of the particular parameter, a task of the dialog-driven application.

17. The one or more non-transitory computer-accessible storage media as recited in claim 16, wherein the set of alternative vocal input styles includes one or more of: (a) a word-pronunciation style, (b) a spell-using-example-words style, or (c) a custom style associated with a problem domain of the dialog-driven application.

18. The one or more non-transitory computer-accessible storage media as recited in claim 16, storing further program instructions that when executed on or across one or more processors further cause the one or more processors to:

obtain an indication of a rule to be applied to determine that input in the particular alternative vocal input style is to be requested, wherein the audio prompt is generated in accordance with the rule.

19. The one or more non-transitory computer-accessible storage media as recited in claim 16, storing further program instructions that when executed on or across one or more processors further cause the one or more processors to:
  obtain an indication, via a programmatic interface from a developer of the dialog-driven application, of at least one alternative vocal input style of the set of alternative vocal input styles.

20. The one or more non-transitory computer-accessible storage media as recited in claim 16, wherein the vocal input obtained subsequent to presentation of the audio prompt comprises (a) a first portion of input expressed in the particular alternative vocal input style and (b) a second portion of input expressed in a style other than the particular alternative vocal input style.

\* \* \* \* \*